(12) United States Patent
Noguchi

(10) Patent No.: US 11,068,095 B2
(45) Date of Patent: *Jul. 20, 2021

(54) TOUCH DETECTION DEVICE AND DISPLAY DEVICE WITH TOUCH DETECTION FUNCTION

(71) Applicant: Japan Display Inc., Tokyo (JP)

(72) Inventor: Koji Noguchi, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/780,510

(22) Filed: Feb. 3, 2020

(65) Prior Publication Data

US 2020/0174616 A1    Jun. 4, 2020

Related U.S. Application Data

(63) Continuation of application No. 15/288,393, filed on Oct. 7, 2016, now Pat. No. 10,592,037.

(30) Foreign Application Priority Data

Oct. 28, 2015    (JP) .................................. 2015-212381

(51) Int. Cl.
*G06F 3/041* (2006.01)
*G06F 3/044* (2006.01)
(Continued)

(52) U.S. Cl.
CPC .......... *G06F 3/0412* (2013.01); *G06F 3/0445* (2019.05); *G06F 3/0446* (2019.05);
(Continued)

(58) Field of Classification Search
CPC ........ G06F 21/32; G06F 3/044; G06F 3/0412; G06F 2203/0338; G06F 3/0416;
(Continued)

(56) References Cited

U.S. PATENT DOCUMENTS 6,476,797 B1   11/2002   Kurihara et al.
8,564,314 B2   10/2013   Shaikh et al.
(Continued)

FOREIGN PATENT DOCUMENTS

CN   104050405   9/2014
CN   204480195   7/2015
(Continued)

OTHER PUBLICATIONS

Chinese Office Action dated Oct. 22, 2019 in corresponding Chinese Application No. 201610950594.1 and English translation of same. 20 pages.

(Continued)

*Primary Examiner* — Michael J Jansen, II
(74) *Attorney, Agent, or Firm* — K&L Gates LLP

(57) ABSTRACT

According to an aspect, a touch detection device includes: a plurality of drive electrodes arranged in parallel with each other; and a plurality of first touch detection electrodes arranged in parallel with each other and arranged at a portion not in contact with the drive electrodes and where the first touch detection electrode forms capacitance with a drive electrode to which a drive signal is output. The drive electrodes includes a drive electrode including a plurality of subdivided electrodes an arrangement pitch of which is finer than an arrangement pitch of the drive electrodes. The drive electrode including the subdivided electrodes is provided such that switching is enabled between a first mode in which the drive signal is collectively output to the subdivided electrodes of the drive electrode and a second mode in which the drive signal is individually output to each of the subdivided electrodes of the drive electrode.

12 Claims, 25 Drawing Sheets

(51) Int. Cl.
*G02F 1/1343* (2006.01)
*G02F 1/1333* (2006.01)

(52) U.S. Cl.
CPC .... *G06F 3/041661* (2019.05); *G02F 1/13338* (2013.01); *G02F 1/134372* (2021.01)

(58) Field of Classification Search
CPC .......... G02F 1/13338; G02F 1/134363; G02F 1/1368; G02F 2001/134345; G02F 2001/134372
See application file for complete search history.

(56) References Cited

U.S. PATENT DOCUMENTS

| | | | |
|---|---|---|---|
| 8,638,305 | B2 | 1/2014 | Inami |
| 8,786,557 | B2 | 7/2014 | Noguchi et al. |
| 9,007,329 | B2 | 4/2015 | Lee et al. |
| 9,092,087 | B2 | 7/2015 | Ishizaki et al. |
| 9,195,878 | B2 | 11/2015 | Weber |
| 9,513,749 | B2 | 12/2016 | Suzuki et al. |
| 9,639,733 | B2 | 5/2017 | Kremin |
| 9,773,148 | B2 | 9/2017 | Mo et al. |
| 9,798,917 | B2 | 10/2017 | Benkley, III |
| 9,851,836 | B2 | 12/2017 | Lin |
| 9,921,705 | B2 | 3/2018 | Shibata et al. |
| 9,990,081 | B2 | 6/2018 | Kim |
| 10,002,278 | B2 | 6/2018 | Song et al. |
| 10,042,467 | B2 | 8/2018 | Schwartz et al. |
| 10,055,054 | B2 | 8/2018 | Lin et al. |
| 10,083,336 | B2 | 9/2018 | Han et al. |
| 10,101,851 | B2 | 10/2018 | Benkley, III et al. |
| 10,108,839 | B2 | 10/2018 | Uehara et al. |
| 10,203,795 | B2 | 2/2019 | Liu et al. |
| 10,203,816 | B2 | 2/2019 | Nelson et al. |
| 10,203,826 | B2 | 2/2019 | Nelson et al. |
| 10,203,827 | B2 | 2/2019 | Nelson et al. |
| 10,203,828 | B2 | 2/2019 | Nelson et al. |
| 10,268,863 | B2* | 4/2019 | Chan .................. G06K 9/0002 |
| 10,282,029 | B2 | 5/2019 | Kurasawa et al. |
| 10,353,513 | B2 | 7/2019 | Mizuhashi et al. |
| 10,360,427 | B2 | 7/2019 | Lee et al. |
| 10,438,041 | B2 | 10/2019 | Apostolos et al. |
| 10,579,849 | B2* | 3/2020 | Kremin ................. G06F 3/0446 |
| 10,592,037 | B2* | 3/2020 | Noguchi ............... G06F 3/0416 |
| 10,606,404 | B2* | 3/2020 | Mizuhashi ........... G06K 9/0002 |
| 10,635,238 | B2* | 4/2020 | Kurasawa ............. G06F 3/0418 |
| 10,860,830 | B2* | 12/2020 | Uehara .................. G06F 21/32 |
| 10,891,001 | B2* | 1/2021 | Mizuhashi ............ G06F 3/0445 |
| 2005/0213797 | A1 | 9/2005 | Umeda |
| 2006/0012570 | A1 | 1/2006 | Yumoto et al. |
| 2010/0066650 | A1 | 3/2010 | Lee et al. |
| 2010/0182125 | A1 | 7/2010 | Abdallah et al. |
| 2010/0182273 | A1 | 7/2010 | Noguchi et al. |
| 2010/0328291 | A1 | 12/2010 | Ishizaki |
| 2011/0025626 | A1 | 2/2011 | Inami |
| 2012/0105081 | A1 | 5/2012 | Shaikh et al. |
| 2013/0069894 | A1 | 3/2013 | Chen et al. |
| 2013/0135247 | A1 | 5/2013 | Na et al. |
| 2014/0253498 | A1 | 9/2014 | Suzuki et al. |
| 2014/0333328 | A1 | 11/2014 | Nelson |
| 2015/0254491 | A1 | 9/2015 | Mo et al. |
| 2015/0269409 | A1 | 9/2015 | Weber |
| 2015/0378481 | A1 | 12/2015 | Cok |
| 2015/0378494 | A1 | 12/2015 | Cok |
| 2016/0054844 | A1 | 2/2016 | Lin et al. |
| 2016/0148034 | A1 | 5/2016 | Kremin et al. |
| 2016/0224818 | A1 | 8/2016 | Song et al. |
| 2016/0283019 | A1 | 9/2016 | Shang |
| 2016/0350570 | A1 | 12/2016 | Han et al. |
| 2016/0364050 | A1 | 12/2016 | Shibata |
| 2016/0364591 | A1 | 12/2016 | El-Khoury et al. |
| 2016/0364593 | A1 | 12/2016 | Lee et al. |
| 2017/0017340 | A1 | 1/2017 | Liu et al. |
| 2017/0123555 | A1 | 5/2017 | Kim |
| 2017/0123566 | A1* | 5/2017 | Noguchi ............... G06F 3/0416 |
| 2017/0169277 | A1 | 6/2017 | Benkley, III et al. |
| 2017/0193265 | A1 | 7/2017 | Chan |
| 2017/0220182 | A1 | 8/2017 | Schwartz et al. |
| 2017/0285846 | A1 | 10/2017 | Mizuhashi et al. |
| 2017/0308228 | A1 | 10/2017 | Benkley, III et al. |
| 2017/0315640 | A1 | 11/2017 | Nelson et al. |
| 2017/0336894 | A1 | 11/2017 | Nelson et al. |
| 2017/0351897 | A1 | 12/2017 | Kremin et al. |
| 2017/0364178 | A1 | 12/2017 | Nelson et al. |
| 2017/0372110 | A1 | 12/2017 | Uehara et al. |
| 2018/0011601 | A1 | 1/2018 | Kurasawa et al. |
| 2018/0012054 | A1 | 1/2018 | Apostolos et al. |
| 2018/0032206 | A1 | 2/2018 | Lin et al. |
| 2019/0018999 | A1 | 1/2019 | Uehara et al. |
| 2019/0220147 | A1 | 7/2019 | Kurasawa et al. |
| 2020/0174616 | A1* | 6/2020 | Noguchi ............... G06F 3/0446 |

FOREIGN PATENT DOCUMENTS

| | | |
|---|---|---|
| JP | 2006-024177 A | 1/2006 |
| JP | 2008-009616 | 1/2008 |
| JP | 2009-244958 A | 10/2009 |
| JP | 2015179486 | 10/2015 |

OTHER PUBLICATIONS

Japanese Office Action dated May 21, 2019 in corresponding Japanese Application No. 2015-212381.
Chinese Office Action dated Mar. 25, 2019 in corresponding Chinese Application No. 201610950594.1.
Japanese Office Action dated Jan. 8, 2019 in corresponding Japanese Application No. 2015-212381.

* cited by examiner

TOUCH DETECTION DEVICE AND DISPLAY DEVICE WITH TOUCH DETECTION FUNCTION

CROSS-REFERENCE TO RELATED APPLICATIONS

The present application is a continuation of U.S. application Ser. No. 15/288,393, filed on Oct. 7, 2016, which claims priority from Japanese Application No. 2015-212381, filed on Oct. 28, 2015, the contents of which are incorporated by reference herein in its entirety.

BACKGROUND

1. Technical Field

The present invention relates to a touch detection device and a display device with a touch detection function.

2. Description of the Related Art

In recent years, attention has been paid to a touch detection device that can detect an external proximity object, what is called a touch panel. The touch panel is, for example, mounted on or integrated with a display device such as a liquid crystal display device to be used as a display device with a touch detection function. In the display device with a touch detection function, various button images and the like are displayed on the display device, so that the touch panel can be used, in place of a typical mechanical button, for inputting information (for example, refer to Japanese Patent Application Laid-open Publication No. 2009-244958).

A fingerprint sensor may be arranged in an electronic apparatus including the display device described above. The fingerprint sensor detects a characteristic pattern (shape) of a fingerprint by detecting roughness of the fingerprint of a finger of a person who touches the fingerprint sensor (for example, refer to Japanese Patent Application Laid-open Publication No. 2006-24177). A detection result of the fingerprint sensor is used for personal authentication, for example.

An electronic apparatus in the related art includes a touch panel and a fingerprint sensor that are separately arranged. Due to this, as a configuration of the fingerprint sensor, a region with which a person's finger is brought into contact needs to be arranged as a separate region independent of a detection region of a touch operation through the touch panel.

For the foregoing reasons, there is a need for a touch detection device and a display device with a touch detection function in which a detection region having higher resolution used for detecting the fingerprint and the like can also be used as a detection region of the touch operation.

SUMMARY

According to an aspect, a touch detection device that detects a touch operation in a detection region based on variation in capacitance, the touch detection device includes: a plurality of drive electrodes arranged in parallel with each other in the detection region; and a plurality of first touch detection electrodes arranged in parallel with each other in the detection region, each of the first touch detection electrodes being arranged at a portion not in contact with the drive electrodes and where the first touch detection electrode forms capacitance with a drive electrode to which a drive signal is output. The drive electrodes includes a drive electrode including a plurality of subdivided electrodes an arrangement pitch of which is finer than an arrangement pitch of the drive electrodes. The drive electrode including the subdivided electrodes is provided such that switching is enabled between a first mode in which the drive signal is collectively output to the subdivided electrodes of the drive electrode and a second mode in which the drive signal is individually output to each of the subdivided electrodes of the drive electrode.

According to another aspect, a display device with a touch detection function that detects a touch operation in a detection region on a display surface side of the display device based on variation in capacitance, the display device with a touch detection function includes: a plurality of drive electrodes arranged in parallel with each other in the detection region; and a plurality of first touch detection electrodes arranged in parallel with each other in the detection region, each of the first touch detection electrodes being arranged at a portion not in contact with the drive electrodes and where the first touch detection electrode forms capacitance with a drive electrode to which a drive signal is output. The drive electrodes includes a drive electrode including a plurality of subdivided electrodes an arrangement pitch of which is finer than an arrangement pitch of the drive electrodes. The drive electrode including the subdivided electrodes is provided such that switching is enabled between a first mode in which the drive signal is collectively output to the subdivided electrodes of the drive electrode and a second mode in which the drive signal is individually output to each of the subdivided electrodes of the drive electrode.

DETAILED DESCRIPTION

Figure 1:
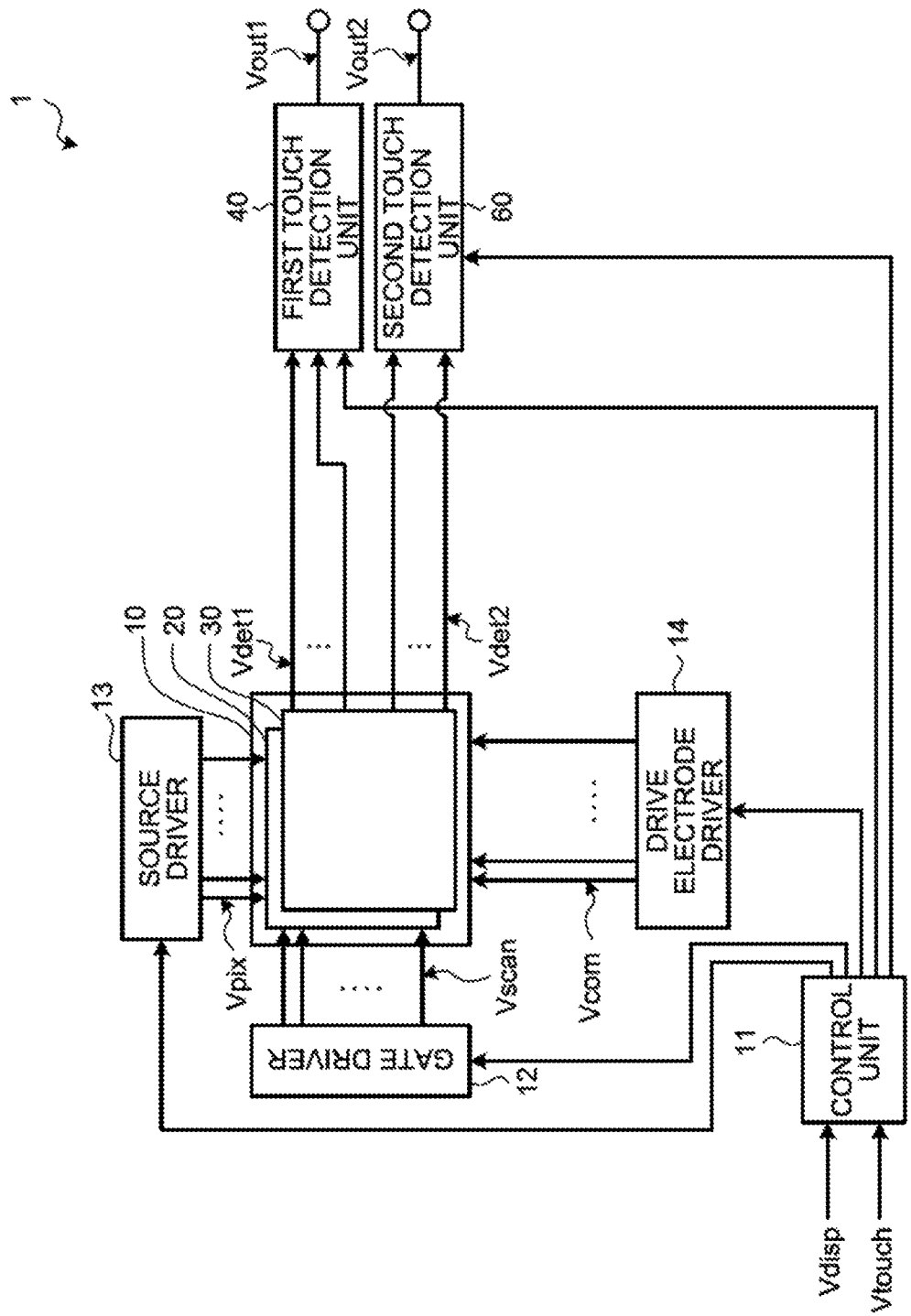
FIG. 1 is a block diagram illustrating a configuration example of a display device with a touch detection function according to an embodiment.

The following describes an embodiment in detail with reference to the drawings. The present invention is not limited to the embodiment described below. Components described below include a component that is easily conceivable by those skilled in the art and substantially the same component. The components described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

In this disclosure, when an element is described as being "on" another element, the element can be directly on the other element, or there can be one or more elements between the element and the other element.

Embodiment

FIG. 1 is a block diagram illustrating a configuration example of a display device 1 with a touch detection function according to an embodiment. As illustrated in FIG. 1, the display device 1 with a touch detection function includes a display unit 10 with a touch detection function, a control unit 11, a gate driver 12, a source driver 13, a drive electrode driver 14, a first touch detection unit 40, and a second touch detection unit 60. In the display device 1 with a touch detection function, a touch detection function is incorporated in the display unit 10 with a touch detection function. The display unit 10 with a touch detection function is a device integrating a display panel 20 including a liquid crystal display element as a display element with a touch panel 30 serving as a touch detection device for detecting a touch input (touch operation). The display unit 10 with a touch detection function may be what is called an on-cell device in which the touch panel 30 is mounted on the display panel 20. The display panel 20 may be, for example, an organic electroluminescent (EL) display panel. In the touch detection, contact on or proximity to the touch panel 30 performed by an external conductor can be detected as a touch operation.

As described later, the display panel 20 sequentially scans for each horizontal line in accordance with a scanning signal Vscan supplied from the gate driver 12, thereby performing display. The control unit 11 is a circuit that supplies a control signal to each of the gate driver 12, the source driver 13, the drive electrode driver 14, and the first touch detection unit 40 based on a video signal Vdisp supplied from the outside, thereby controlling these components to operate in synchronization with each other.

The gate driver 12 has a function of sequentially selecting one horizontal line to be a display driving target of the display unit 10 with a touch detection function based on the control signal supplied from the control unit 11.

The source driver 13 is a circuit that supplies a pixel signal Vpix to each sub-pixel SPix (described later) in the display unit 10 with a touch detection function based on the control signal supplied from the control unit 11.

The drive electrode driver 14 is a circuit that supplies a drive signal Vcom to a drive electrode COML (described later) in the display unit 10 with a touch detection function based on the control signal supplied from the control unit 11.

Figure 10:
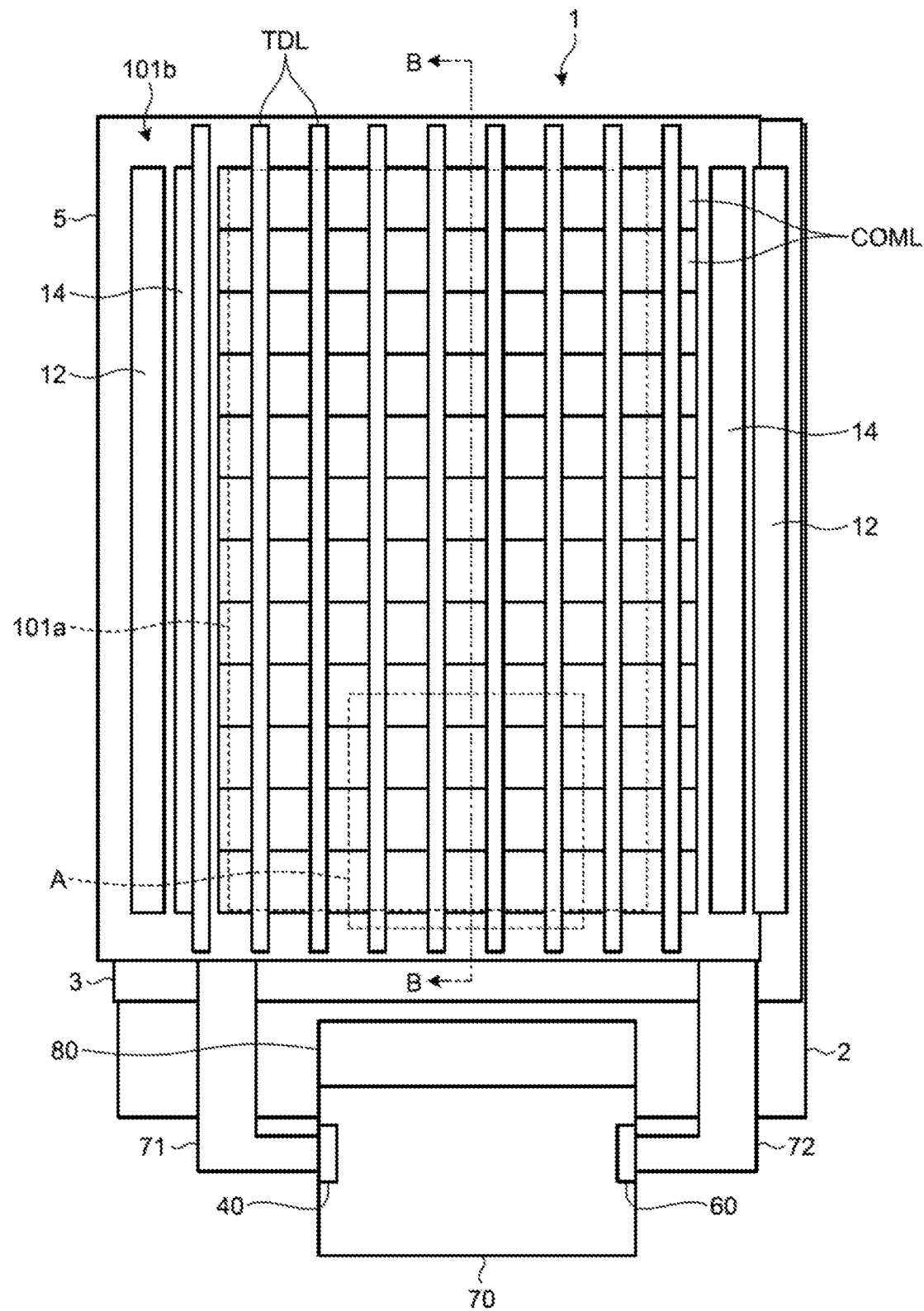
FIG. 10 is a plan view schematically illustrating the display device with a touch detection function.

The touch panel 30 operates based on a basic principle of capacitive touch detection, and performs a touch detection operation using a mutual-capacitive system to detect contact or proximity of an external conductor in a detection region including a display region 101$a$ (refer to FIG. 10 and other figures). The touch panel 30 may perform the touch detection operation using a self-capacitive system.

Figure 2:
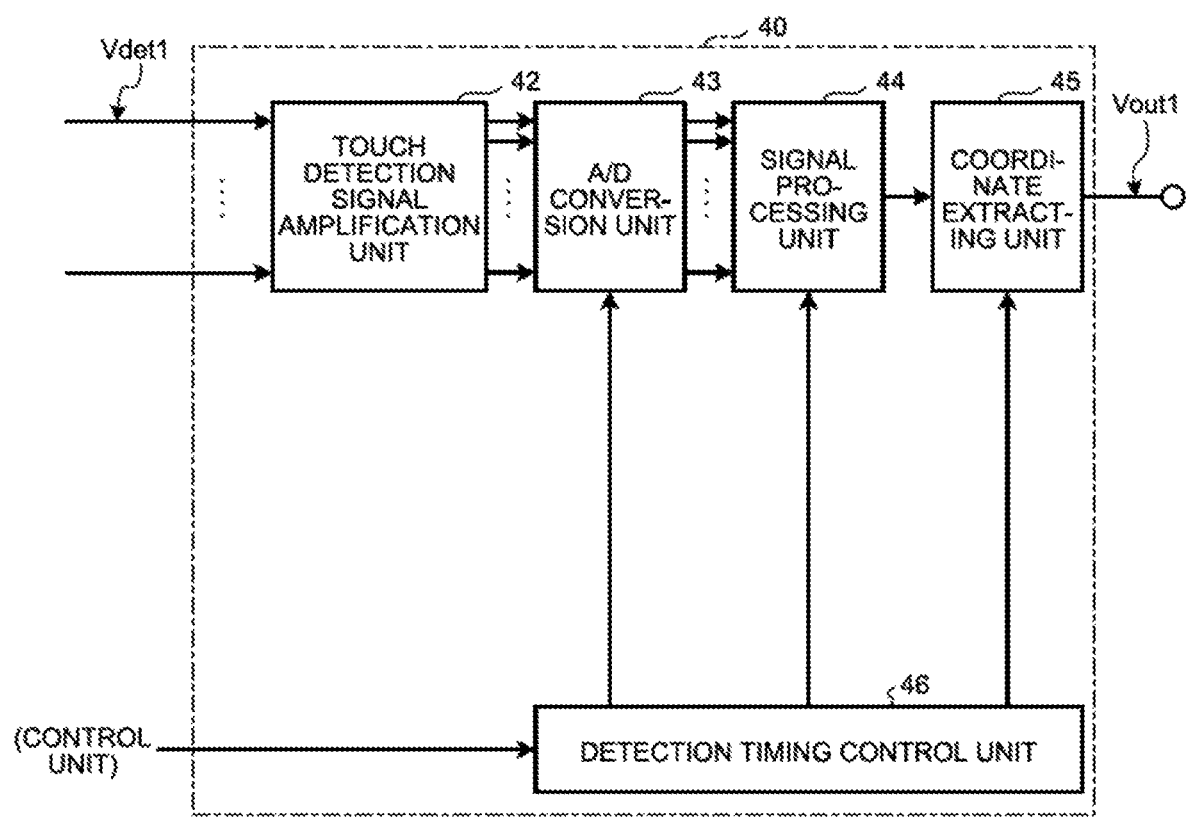
FIG. 2 is a block diagram illustrating a configuration of a principal function of a first touch detection unit.

FIG. 2 is a block diagram illustrating a configuration of a principal function of the first touch detection unit 40. The first touch detection unit 40 is a circuit that detects whether there is a touch operation on or to the touch panel 30 based on the control signal such as a clock signal supplied from the control unit 11 and based on a first touch detection signal Vdet1 supplied from the touch panel 30. The first touch detection unit 40 obtains coordinates at which the touch input is performed when there is a touch operation. The first touch detection unit 40 includes a touch-detection-signal amplification unit 42, an A/D conversion unit 43, a signal processing unit 44, and a coordinate extracting unit 45. A detection timing control unit 46 controls the A/D conversion unit 43, the signal processing unit 44, and the coordinate extracting unit 45 based on the control signal supplied from the control unit 11 such that they operate in synchronization with each other.

Figure 3:
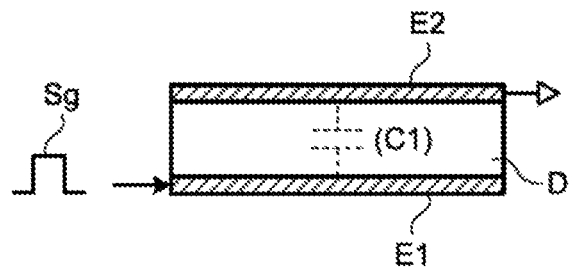
FIG. 3 is an explanatory diagram for explaining a basic principle of mutual-capacitive touch detection and illustrates a state in which a finger is in a non-contact state or a non-proximate state.
Figure 4:
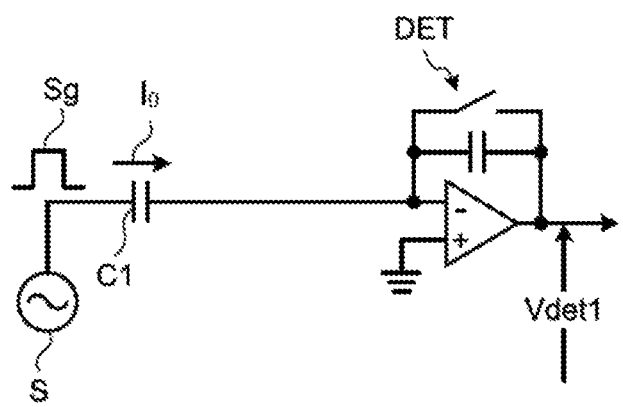
FIG. 4 is an explanatory diagram illustrating an example of an equivalent circuit of a state in which the finger is in the non-contact state or the non-proximate state as illustrated in FIG. 3.
Figure 5:
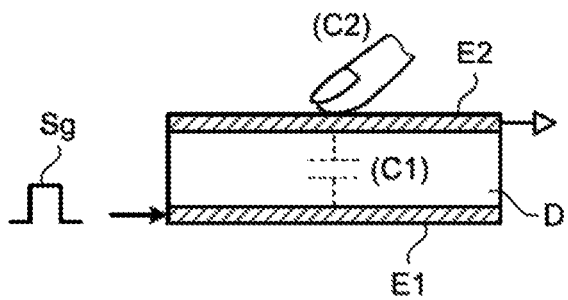
FIG. 5 is an explanatory diagram for explaining the basic principle of mutual-capacitive touch detection and illustrates a state in which the finger is in a contact state or a proximate state.
Figure 6:
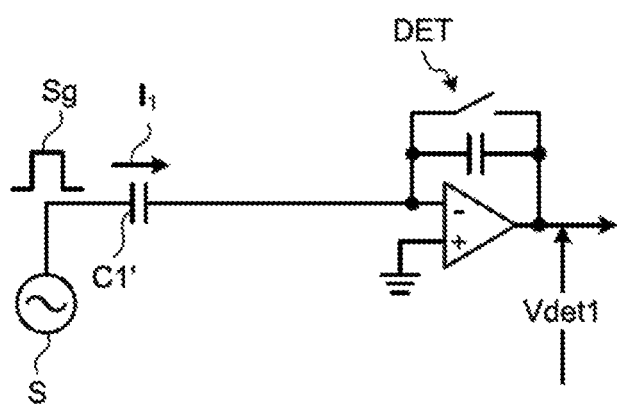
FIG. 6 is an explanatory diagram illustrating an example of an equivalent circuit of the state in which the finger is in the contact state or the proximate state as illustrated in FIG. 5.
Figure 7:
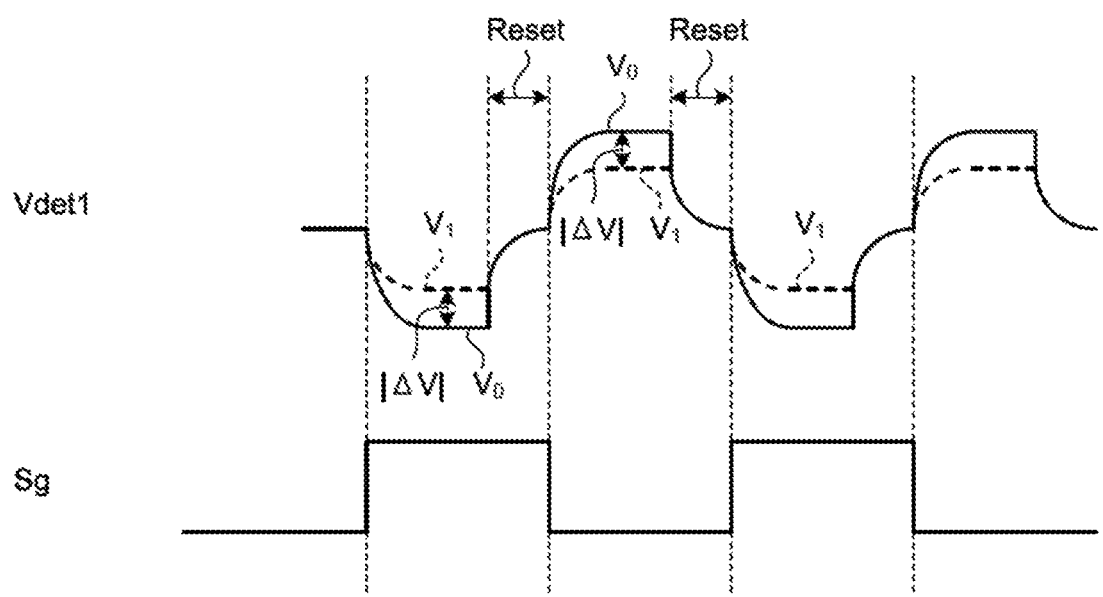
FIG. 7 is a diagram illustrating an example of waveforms of a drive signal and a touch detection signal for mutual-capacitive touch detection.

As described above, the touch panel 30 operates based on the basic principle of capacitive touch detection. With reference to FIGS. 3 to 7, the following describes the basic principle of mutual-capacitive touch detection performed by the display device 1 with a touch detection function according to the present embodiment. FIG. 3 is an explanatory diagram for explaining the basic principle of mutual-capacitive touch detection and illustrates a state in which a finger is in a non-contact state or a non-proximate state. FIG. 4 is an explanatory diagram illustrating an example of an equivalent circuit of the state in which the finger is in the non-contact state or the non-proximate state as illustrated in FIG. 3. FIG. 5 is an explanatory diagram for explaining the basic principle of mutual-capacitive touch detection and illustrates a state in which the finger is in a contact state or a proximate state. FIG. 6 is an explanatory diagram illustrating an example of an equivalent circuit of the state in which the finger is in the contact state or the proximate state as illustrated in FIG. 5. FIG. 7 is a diagram illustrating an example of waveforms of the drive signal Vcom and the first touch detection signal Vdet1. The following describes a case in which a finger is in contact with or proximate to the touch panel. Alternatively, for example, an object including a conductor such as a stylus pen may be used instead of the finger. The drive signal Vcom represents a signal that is output to the drive electrode COML, and does not represent a signal corresponding to a specific voltage.

For example, as illustrated in FIG. 3, a capacitive element C1 includes a pair of electrodes arranged facing each other with a dielectric D interposed therebetween, that is, a drive electrode E1 and a touch detection electrode E2. As illustrated in FIG. 4, one end of the capacitive element C1 is coupled to an alternate current (AC) signal source (driving signal source) S, and the other end thereof is coupled to a voltage detector DET. The voltage detector DET is, for example, an integrating circuit included in the touch-detection-signal amplification unit 42 illustrated in FIG. 1.

When an AC rectangular wave Sg having a predetermined frequency (for example, about several kHz to several hundreds kHz) is applied to the drive electrode E1 (one end of the capacitive element C1) from the AC signal source S, an output waveform (first touch detection signal Vdet1) as illustrated in FIG. 7 appears via the voltage detector DET coupled to the touch detection electrode E2 (the other end of the capacitive element C1). The AC rectangular wave Sg corresponds to the drive signal Vcom input from the drive electrode driver 14, for example.

In a state in which the finger is not in contact with or proximate to the touch panel (non-contact state), as illustrated in FIGS. 3 and 4, a current $I_0$ corresponding to a capacitance value of the capacitive element C1 flows with charge and discharge of the capacitive element C1. The voltage detector DET illustrated in FIG. 4 converts variation in the current $I_0$ corresponding to the AC rectangular wave Sg into variation in voltage (a waveform $V_0$ of a solid line (refer to FIG. 7)).

In a state in which the finger is in contact with or proximate to the touch panel (contact state), as illustrated in FIG. 5, capacitance C2 formed by the finger is in contact with or proximate to the touch detection electrode E2, so that capacitance corresponding to a fringe between the drive electrode E1 and the touch detection electrode E2 is shielded. Due to this, as illustrated in FIG. 6, the capacitive element C1 functions as a capacitive element C1' having a capacitance value smaller than the capacitance value in the non-contact state. With reference to the equivalent circuit illustrated in FIG. 6, a current $I_1$ flows through the capacitive element C1'. As illustrated in FIG. 7, the voltage detector DET converts variation in the current $I_1$ corresponding to the AC rectangular wave Sg into variation in voltage (a waveform $V_1$ of a dotted line). In this case, amplitude of the waveform $V_1$ is smaller than that of the waveform $V_0$ described above. Accordingly, an absolute value |ΔV| of a voltage difference between the waveform $V_0$ and the waveform $V_1$ varies depending on influence of a conductor such as a finger that is brought into contact with or proximate to the touch panel from the outside. To accurately detect the absolute value |ΔV| of the voltage difference between the waveform $V_0$ and the waveform $V_1$, it is more preferable to provide, to an operation of the voltage detector DET, a period Reset for resetting charge and discharge of a capacitor in accordance with a frequency of the AC rectangular wave Sg through switching in the circuit.

The touch panel 30 illustrated in FIG. 1 sequentially scans each detection block in accordance with the drive signal Vcom supplied from the drive electrode driver 14, thereby performing mutual-capacitive touch detection.

The touch panel 30 outputs the first touch detection signal Vdet1 of each detection block via the voltage detector DET illustrated in FIG. 4 or FIG. 6 from a plurality of first touch detection electrodes TDL described later. The first touch detection signal Vdet1 is supplied to the touch-detection-signal amplification unit 42 of the first touch detection unit 40.

The touch-detection-signal amplification unit 42 amplifies the first touch detection signal Vdet1 supplied from the touch panel 30. The touch-detection-signal amplification unit 42 may include an analog low pass filter (LPF) that removes a high frequency component (noise component) included in the first touch detection signal Vdet1 and outputs the remaining.

The A/D conversion unit 43 samples each analog signal that is output from the touch-detection-signal amplification unit 42 at a timing synchronized with the drive signal Vcom, and converts the analog signal into a digital signal.

The signal processing unit 44 includes a digital filter that reduces a frequency component (noise component) other than a frequency at which the drive signal Vcom is sampled included in the output signal of the A/D conversion unit 43. The signal processing unit 44 is a logic circuit that detects whether there is a touch operation on or to the touch panel 30 based on the output signal of the A/D conversion unit 43. The signal processing unit 44 performs processing of extracting only a difference of the detection signal caused by the finger. The signal of the difference caused by the finger corresponds to the absolute value |ΔV| of the difference between the waveform $V_0$ and the waveform $V_1$ described above. The signal processing unit 44 may perform an arithmetic operation for averaging the absolute value |ΔV| for each detection block to obtain an average value of the absolute value |ΔV|. Due to this, the signal processing unit 44 can suppress influence of the noise. The signal processing unit 44 compares the detected signal of the difference caused by the finger with a predetermined threshold voltage. If the signal of the difference is smaller than the threshold voltage, the signal processing unit 44 determines that an external proximity object is in the non-contact state. If the signal of the difference is equal to or larger than the threshold voltage, the signal processing unit 44 determines that the external proximity object is in the contact state. In this way, the first touch detection unit 40 can perform touch detection. In this way, the first touch detection unit 40 detects a touch operation based on variation in the capacitance in the first touch detection electrode TDL.

The coordinate extracting unit 45 is a logic circuit that obtains, when a touch operation is detected by the signal processing unit 44, touch panel coordinates at which the touch operation is detected. The coordinate extracting unit 45 outputs the touch panel coordinates as a detection signal output Vout1. As described above, the display device 1 with a touch detection function according to the present embodiment can detect the touch panel coordinates of the position where a conductor such as a finger is in contact with or proximate to a touch panel, based on the basic principle of mutual-capacitive touch detection.

Figure 8:
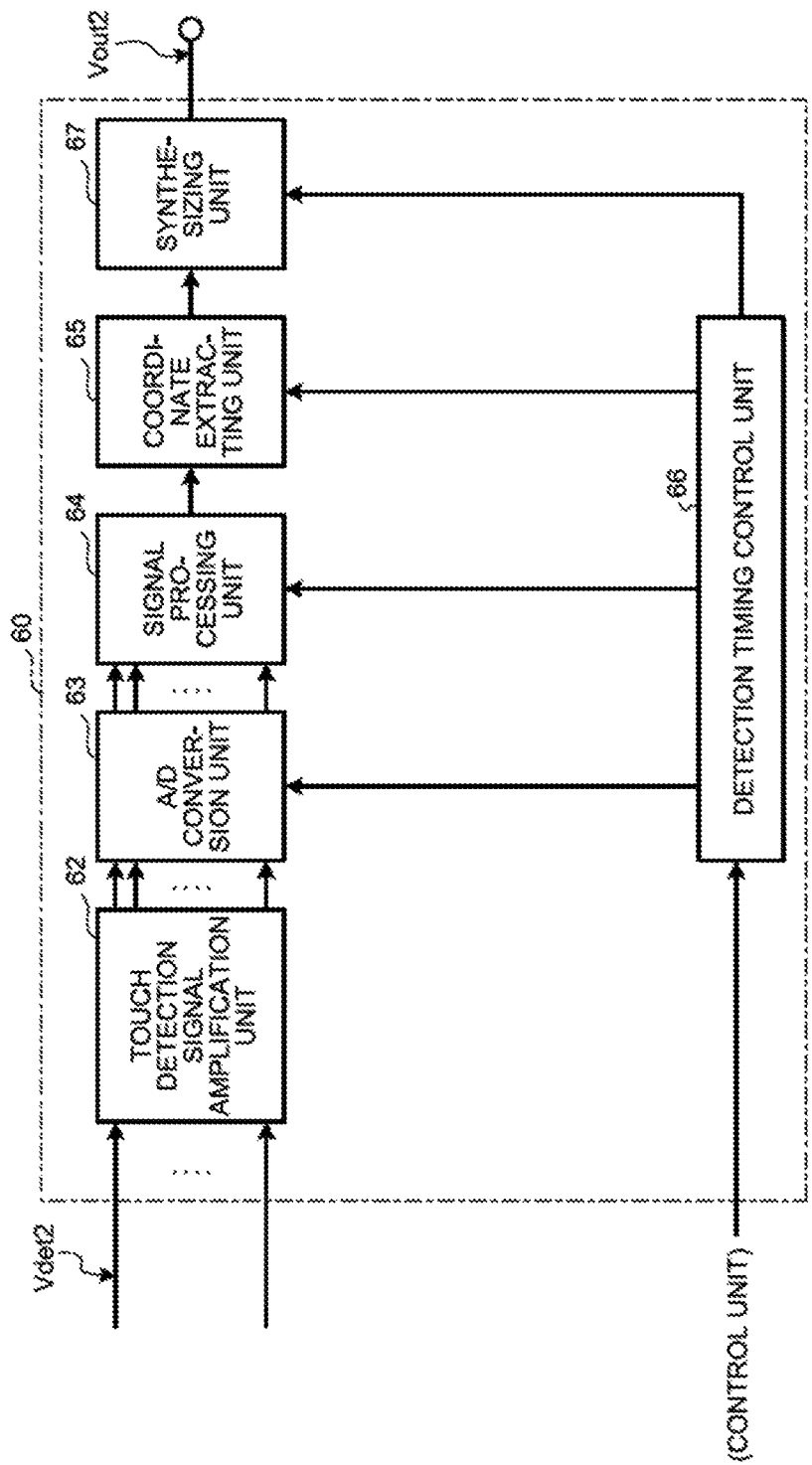
FIG. 8 is a block diagram illustrating a configuration of a principal function of a second touch detection unit.

FIG. 8 is a block diagram illustrating a configuration of a principal function of a second touch detection unit 60. The second touch detection unit 60 is a circuit that detects whether there is a touch operation at a finer pitch than the first touch detection unit 40 based on the control signal such as a clock signal supplied from the control unit 11 and a second touch detection signal Vdet2 supplied from the touch panel 30. The second touch detection unit 60 includes, for example, a touch-detection-signal amplification unit 62, an A/D conversion unit 63, a signal processing unit 64, a coordinate extracting unit 65, a detection timing control unit 66, and a synthesizing unit 67. Functions of the touch-detection-signal amplification unit 62, the A/D conversion unit 63, the signal processing unit 64, the coordinate extracting unit 65, and the detection timing control unit 66 are similar to the functions of the touch-detection-signal amplification unit 42, the A/D conversion unit 43, the signal processing unit 44, the coordinate extracting unit 45, and the detection timing control unit 46. The second touch detection unit 60 is coupled to a second touch detection electrode STDL (refer to FIG. 14 and other figures) in the same manner as the first touch detection unit 40 being coupled to the first touch detection electrode TDL. The second touch detection signal Vdet2 from the second touch detection electrode STDL is supplied to the touch-detection-signal amplification unit 62 of the second touch detection unit 60.

Figure 9:
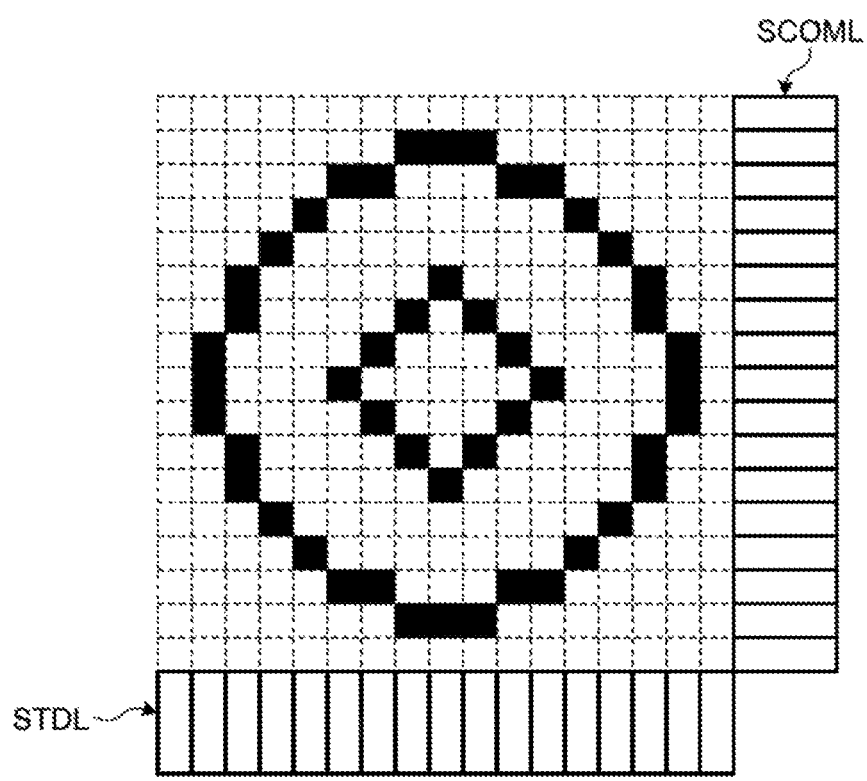
FIG. 9 is a schematic diagram illustrating a mechanism of fingerprint detection performed by the second touch detection unit.

FIG. 9 is a schematic diagram illustrating a mechanism of fingerprint detection performed by the second touch detection unit 60. The synthesizing unit 67 combines second touch detection signals Vdet2 from a plurality of second touch detection electrodes STDL to generate two-dimensional information indicating a shape of the external proximity object performing a touch operation on the second touch detection electrodes STDL. Specifically, the synthesizing unit 67 generates a two-dimensional image representing, as a shade of color (for example, a gray scale), a difference in detected intensity corresponding to a difference in a degree of contact with respect to a cover member 5 (refer to FIG. 10) due to roughness of the external proximity object (for example, a finger of a person). An output Vout2 of the second touch detection unit 60 including the synthesizing unit 67 is, for example, an output of the two-dimensional information described above.

FIG. 9 exemplifies two-gradation detection indicating only whether there is a touch operation for clarification, but actually, a touch detection result in each block can be multi-gradation. In FIG. 9, the detected external proximity object is an object having a double-circle-shaped projection. If the external proximity object is a finger of a person having a fingerprint, the fingerprint pattern can be obtained as the two-dimensional information. The function of the synthesizing unit 67 may be included in a configuration other than the second touch detection unit 60. For example, an output of the coordinate extracting unit 65 may be the output Vout2 of the second touch detection unit 60, and an external configuration may generate the two-dimensional information based on the output Vout2. A configuration related to generation of the two-dimensional information may be implemented as hardware such as a circuit, or what is called software processing.

Figure 11:
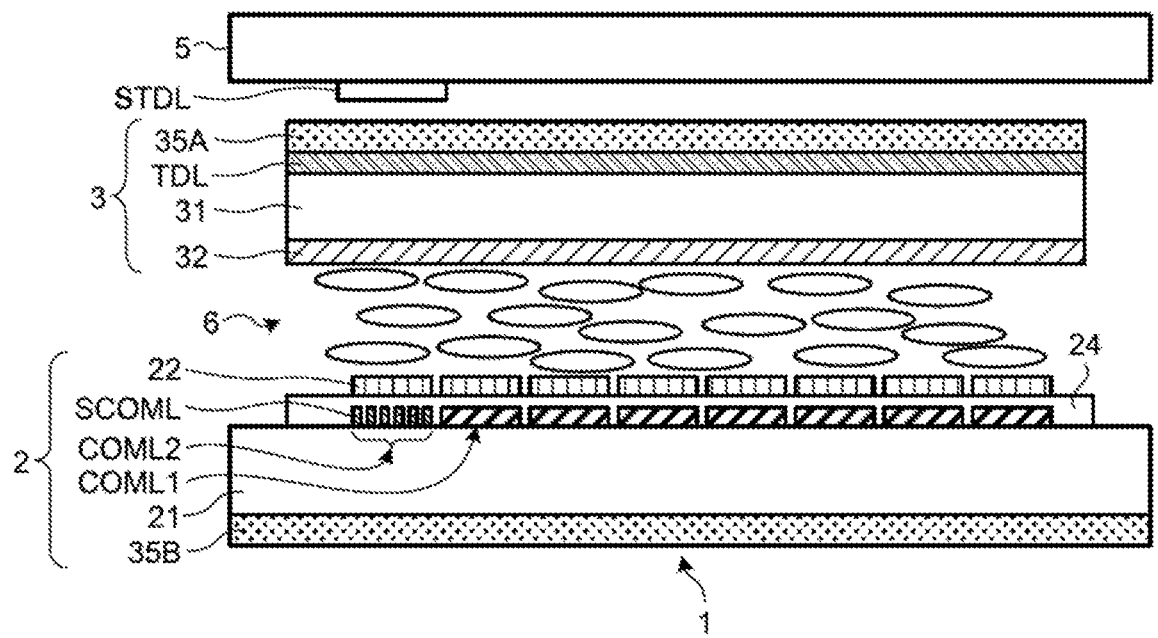
FIG. 11 is a B-B cross-sectional view of a schematic structure of the display device with a touch detection function according to the embodiment.
Figure 12:
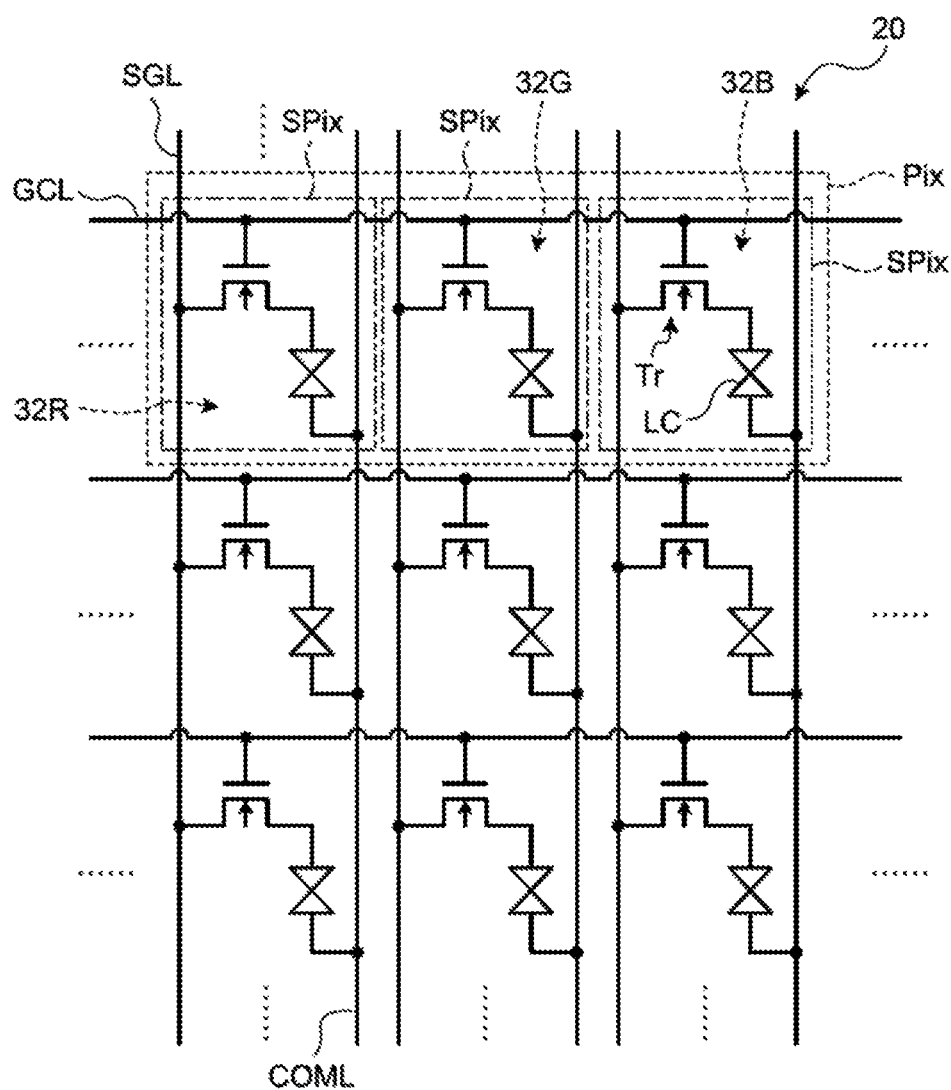
FIG. 12 is a circuit diagram of a pixel array of a display unit with a touch detection function according to the embodiment.

Next, the following describes a configuration example of the display device 1 with a touch detection function in detail. FIG. 10 is a plan view schematically illustrating the display device 1 with a touch detection function. FIG. 11 is a B-B cross-sectional view of a schematic structure of the display device 1 with a touch detection function. FIG. 12 is a circuit diagram of a pixel array of a display unit with a touch detection function according to the embodiment. FIG. 10 does not illustrate a subdivided electrode SCOML and the second touch detection electrode STDL (described later). In the following description, the drive electrode not including the subdivided electrode SCOML is referred to as a drive electrode COML1, the drive electrode including the subdivided electrode SCOML is referred to as a drive electrode COML2, and the drive electrode COML1 and the drive electrode COML2 are collectively called the drive electrode COML in some cases.

In the embodiment, a detection block, which will be described later, is a bundle of drive electrodes COML (or a bundle of subdivided electrodes SCOML) to which the drive signal Vcom is collectively output in the touch detection. A drive electrode block, which will be described later, includes one or more drive electrodes COML. The number of drive electrodes COML included in one drive electrode block can be predetermined. A subdivided electrode block, which will be described later, includes one or more subdivided electrodes SCOML. The number of subdivided electrodes SCOML included in one subdivided electrode block can be predetermined. It is only required that the number of subdivided electrodes SCOML included in one subdivided electrode block is less than the number of subdivided electrodes SCOML included in one drive electrode COML2. The display device 1 with a touch detection function is capable to operating in a first mode and a second mode. In the embodiment, the detection block in the first mode corresponds to the drive electrode block, and the detection block in the second mode corresponds to the subdivided electrode block. An arrangement pitch of the detection blocks (detection pitch) in the second mode is finer than an arrangement pitch of the detection blocks (detection pitch) in the first mode. In the embodiment, one subdivided electrode SCOML corresponds to one subdivided electrode block, and also corresponds to one detection block in the second mode, for example. The first mode and the second mode will be described later in detail.

As illustrated in FIG. 10, the display device 1 with a touch detection function includes a pixel substrate 2 and a counter substrate 3. The pixel substrate 2 and the counter substrate 3 overlap each other. The configuration of the display device 1 with a touch detection function further includes a display control IC (not illustrated in FIG. 10). The display device 1 with a touch detection function includes, for example, a display region 101a for displaying an image, and a picture frame region 101b outside the display region 101a. For example, the display region 101a has a rectangular shape having a long side and a short side, but the shape of the display region can be appropriately changed. The picture frame region 101b has a frame shape surrounding part of or the entire edge of the display region 101a.

A plurality of drive electrodes COML and a plurality of first touch detection electrodes TDL are arranged in the display region 101a. The drive electrodes COML extend in a predetermined direction of the display region 101a and are arranged in parallel with each other in a direction orthogonal to the predetermined direction. Specifically, for example, the drive electrodes COML extend in a direction along a first side of the rectangular display region 101a and are arranged in parallel with each other in a direction along a second side thereof orthogonal to the first side. The first touch detection electrodes TDL extend, for example, in a direction orthogonal to the predetermined direction in which the drive electrodes COML extend and are arranged in parallel with each other in the predetermined direction.

The pixel substrate 2 includes a TFT substrate 21 serving as a circuit board, a plurality of pixel electrodes 22 arranged in a matrix on the upper side of the TFT substrate 21, the drive electrodes COML arranged between the TFT substrate 21 and the pixel electrode 22, and an insulating layer 24 that insulates the pixel electrode 22 from the drive electrodes COML. A polarizing plate 35B may be arranged on the lower side of the TFT substrate 21 via a bonding layer.

The counter substrate 3 includes a glass substrate 31 and a color filter 32 formed on one surface of the glass substrate 31. The first touch detection electrode TDL serving as a detection electrode of the touch panel 30 is arranged on the other surface of the glass substrate 31. A polarizing plate 35A is arranged on the upper side of the first touch detection electrode TDL.

The TFT substrate 21 and the glass substrate 31 are arranged facing each other with a predetermined gap therebetween via a spacer (not illustrated). A liquid crystal layer 6 is arranged in a space between the TFT substrate 21 and the glass substrate 31. The liquid crystal layer 6 modulates light passing therethrough depending on a state of an electric field. For example, the liquid crystal layer 6 includes liquid crystals of lateral electric-field mode such as in-plane switching (IPS) including fringe field switching (FFS). An orientation film may be arranged between the liquid crystal layer 6 and the pixel substrate 2, and between the liquid crystal layer 6 and the counter substrate 3 illustrated in FIG. 11.

The TFT substrate 21 is provided with a thin film transistor element (hereinafter, referred to as a TFT element) Tr of each sub-pixel SPix illustrated in FIG. 12, and wiring such as a pixel signal line SGL that supplies the pixel signal Vpix to each pixel electrode 22 and a scanning signal line GCL that supplies the drive signal Vcom for driving each TFT element Tr. The pixel signal line SGL and the scanning signal line GCL extend along a plane parallel with the surface of the TFT substrate 21.

The display panel 20 illustrated in FIG. 12 includes a plurality of sub-pixels SPix arranged in a matrix. Each sub-pixel SPix includes the TFT element Tr and a liquid crystal element LC. The TFT element Tr is constituted of a thin film transistor. In this example, the TFT element Tr is constituted of an n-channel metal oxide semiconductor (MOS) TFT. A source of the TFT element Tr is coupled to the pixel signal line SGL, a gate thereof is coupled to the scanning signal line GCL, and the drain thereof is coupled to one end of the liquid crystal element LC. One end of the liquid crystal element LC is coupled to the drain of the TFT element Tr, and the other end thereof is coupled to the drive electrode COML.

The sub-pixel SPix is coupled to the other sub-pixels SPix belonging to the same row in the display panel 20 via the scanning signal line GCL. The scanning signal line GCL is coupled to the gate driver 12 (refer to FIG. 1), and receives the scanning signal Vscan supplied from the gate driver 12. The sub-pixel SPix is coupled to the other sub-pixels SPix belonging to the same column in the display panel 20 via the pixel signal line SGL. The pixel signal line SGL is coupled to the source driver 13 (refer to FIG. 1), and receives the pixel signal Vpix supplied from the source driver 13. The sub-pixel SPix is further coupled to the other sub-pixels SPix belonging to the same column via the drive electrode COML. The drive electrode COML is coupled to the drive electrode driver 14 (refer to FIG. 1), and receives the drive signal Vcom supplied from the drive electrode driver 14. That is, in this example, a plurality of sub-pixels SPix belonging to the same column share one drive electrode COML. The drive electrode COML according to the present embodiment extends in parallel with an extending direction of the pixel signal line SGL, and extends in a direction intersecting with an extending direction of the scanning signal line GCL. The extending direction of the drive electrode COML is not limited thereto. For example, the drive electrode COML may extend in a direction parallel with the scanning signal line GCL.

The gate driver 12 illustrated in FIG. 1 drives the scanning signal lines GCL to sequentially scan each of the scanning signal lines GCL. The gate driver 12 applies the scanning signal Vscan (refer to FIG. 1) to a gate of the TFT element Tr of the sub-pixel SPix via the scanning signal line GCL to sequentially select one line (one horizontal line) of the sub-pixels SPix as the display driving target. In the display device 1 with a touch detection function, the source driver 13 supplies the pixel signals Vpix to the sub-pixels SPix belonging to the selected one horizontal line via the pixel signal lines SGL illustrated in FIG. 12. The sub-pixels SPix perform display for each horizontal line based on the pixel signals Vpix supplied to the sub-pixels SPix. During this display operation, the drive electrode driver 14 applies the drive signal Vcom to the drive electrode COML. A common potential is supplied to the pixel electrode 22 by the drive signal Vcom in the display operation.

In the color filter 32 illustrated in FIG. 11, for example, color regions of the color filter colored in three colors of red (R), green (G), and blue (B) may be periodically arranged. Color regions of three colors R, G, and B correspond to the sub-pixels SPix illustrated in FIG. 12, and a pixel Pix is constituted of a set of sub-pixels SPix corresponding to the color regions of three colors. As illustrated in FIG. 11, the color filter 32 faces the liquid crystal layer 6 in a direction perpendicular to the TFT substrate 21. Another combination of colors may be employed for the color filter 32 so long as the colors are different from each other. The combination of colors for the color filter 32 is not limited to three colors. Alternatively, four or more colors may be combined.

Figure 13:
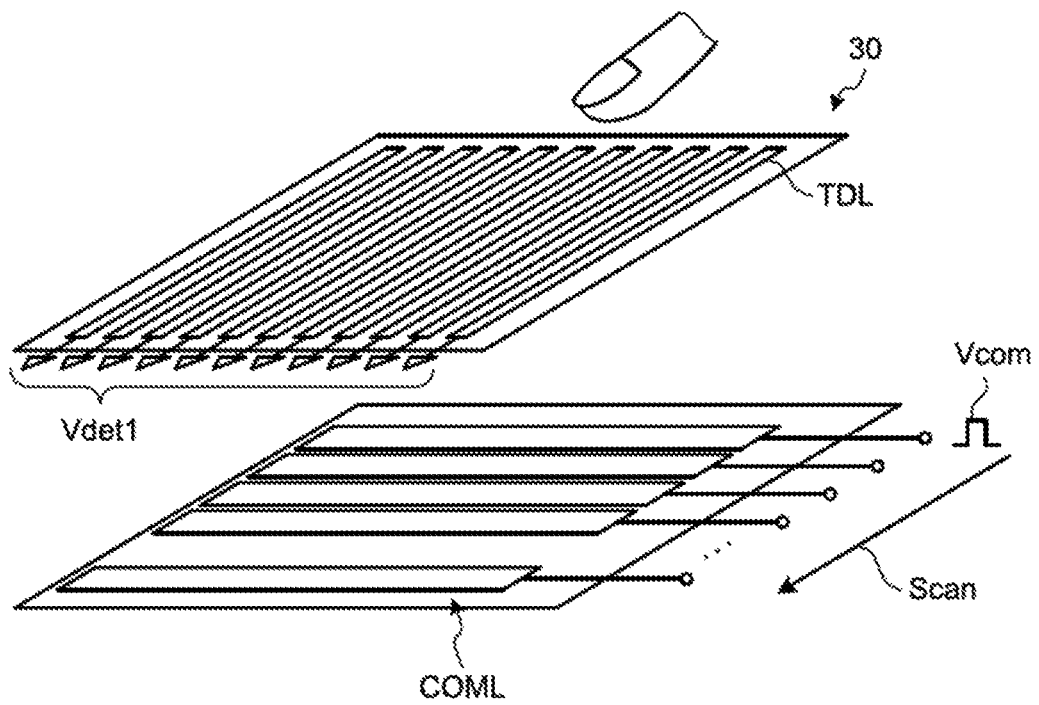
FIG. 13 is a perspective view of a configuration example of a drive electrode and a touch detection electrode of the display unit with a touch detection function according to the embodiment.

The drive electrode COML functions as a common electrode that gives a common potential to the pixel electrodes 22 of the display panel 20, and also functions as an electrode to which the drive signal is output in performing mutual-capacitive touch detection of the touch panel 30. The drive electrode COML may also function as a detection electrode for performing self-capacitive touch detection of the touch panel 30. FIG. 13 is a perspective view of a configuration example of the drive electrode COML and the touch detection electrode TDL of the display unit 10 with a touch detection function according to the embodiment. The touch panel 30 includes the drive electrode COML arranged in the pixel substrate 2 and the first touch detection electrode TDL arranged in the counter substrate 3.

The drive electrodes COML have a plurality of striped electrode patterns extending in a horizontal direction of FIG. 13. The first touch detection electrodes TDL have a plurality of electrode patterns extending in a direction intersecting with the extending direction of the electrode patterns of the drive electrodes COML. The first touch detection electrodes TDL face the drive electrodes COML in a direction perpendicular to the surface of the TFT substrate 21 (refer to FIG. 11). Each electrode pattern of the first touch detection electrode TDL is coupled to an input terminal of the touch-detection-signal amplification unit 42 in the first touch detection unit 40 (refer to FIG. 1). Capacitance is formed at each intersecting portion between each electrode pattern of the drive electrode COML and each electrode pattern of the first touch detection electrode TDL.

A translucent conductive material such as indium tin oxide (ITO) is used for the first touch detection electrode TDL, the drive electrode COML, and the second touch detection electrode STDL, for example. The shape of the electrodes used for touch detection such as the first touch detection electrode TDL and the drive electrode COML is not limited to a plurality of stripes. For example, the first touch detection electrode TDL and the drive electrode COML may have a comb-teeth shape. Alternatively, it is sufficient that the first touch detection electrode TDL and the drive electrode COML have a pattern divided into a plurality of parts, and the shape of slits that separate the drive electrodes COML may be a straight line or a curved line. The same applies to the shape of the second touch detection electrode and the subdivided electrode SCOML described later.

When the touch panel 30 performs a mutual-capacitive touch detection operation, the drive electrode driver 14 drives the drive electrodes COML to sequentially scan them in a time division manner as a drive electrode block, so that one detection block of the drive electrode COML is sequentially selected. When the first touch detection signal Vdet1 is output from the first touch detection electrode TDL, touch detection for one detection block is performed. That is, the drive electrode block corresponds to the drive electrode E1 in the basic principle of mutual-capacitive touch detection described above, the first touch detection electrode TDL corresponds to the touch detection electrode E2, and the touch panel 30 detects a touch input in accordance with the basic principle. As illustrated in FIG. 13, in the touch panel 30, the first touch detection electrode TDL and the drive electrode COML intersecting with each other constitute a capacitive touch sensor in a matrix. Thus, by scanning across the entire touch detection surface of the touch panel 30, a position where an external conductor is brought into contact with or proximate to the touch panel 30 can be detected.

The touch detection surface of the touch panel 30 also functions as a display surface through which a display output is performed by the display panel 20. In this embodiment, the translucent cover member has a first surface facing the counter substrate 3 and a second surface opposite to the first surface. The touch detection surface is the second surface of the cover member 5. Thus, a display region in which a display output is performed by the display panel 20 overlaps with a detection region in which touch detection is performed by the touch panel 30. A degree of overlapping between the display region and the detection region can be predetermined. For example, the detection region preferably covers the entire display region.

As described above, the touch panel 30 includes a plurality of drive electrodes COML arranged in parallel with each other in the detection region and a plurality of first touch detection electrodes TDL arranged in parallel with each other in the detection region, and each of the first touch detection electrodes TDL being arranged at a portion not in contact with the drive electrode COML and where the first touch detection electrode TDL forms capacitance with the drive electrode COML to which the drive signal Vcom is output. The touch panel 30 functions as a touch detection device that detects a touch operation in the detection region based on variation in capacitance.

A device driver integrated circuit (DDIC) 80 is on the pixel substrate 2. For example, a function related to the control unit 11 and the source driver 13 is implemented in the DDIC 80. Wiring through which an external signal (for example, the video signal Vdisp and a fingerprint-detection implementation signal Vtouch) is transmitted is coupled to the DDIC 80. Specifically, such wiring is provided as a flexible printed circuits (FPC) 70, for example.

In the embodiment, as illustrated in FIG. 10, for example, the first touch detection unit 40 and the second touch detection unit 60 are arranged on the FPC 70 using what is called a chip on flexible (COF) method. However, this is merely an example of a specific arrangement of the first touch detection unit 40 and the second touch detection unit 60, and the arrangement is not limited thereto. The arrangement of the first touch detection unit 40 and the second touch detection unit 60 can be appropriately modified.

In the embodiment, wiring that couples the first touch detection unit 40 to the first touch detection electrode TDL is arranged as an FPC 71. In the embodiment, wiring that couples the second touch detection unit 60 to the second touch detection electrode STDL is arranged as an FPC 72.

The FPCs 71 and 72 are merely an example of a specific configuration of the wiring. The wiring is not limited thereto, and can be appropriately modified.

Figure 14:
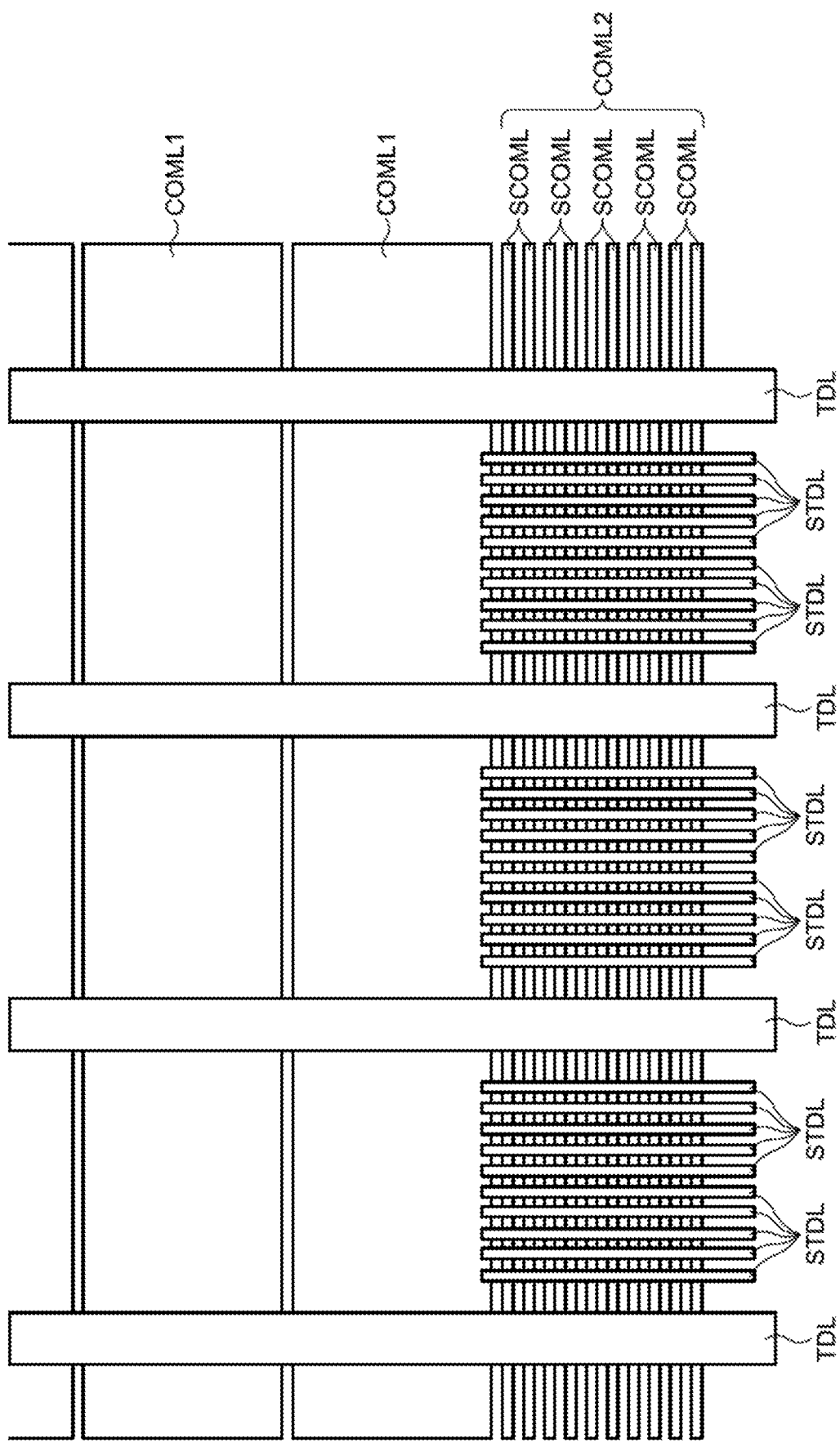
FIG. 14 is an enlarged view of the area A illustrated in FIG. 10.
Figure 15:
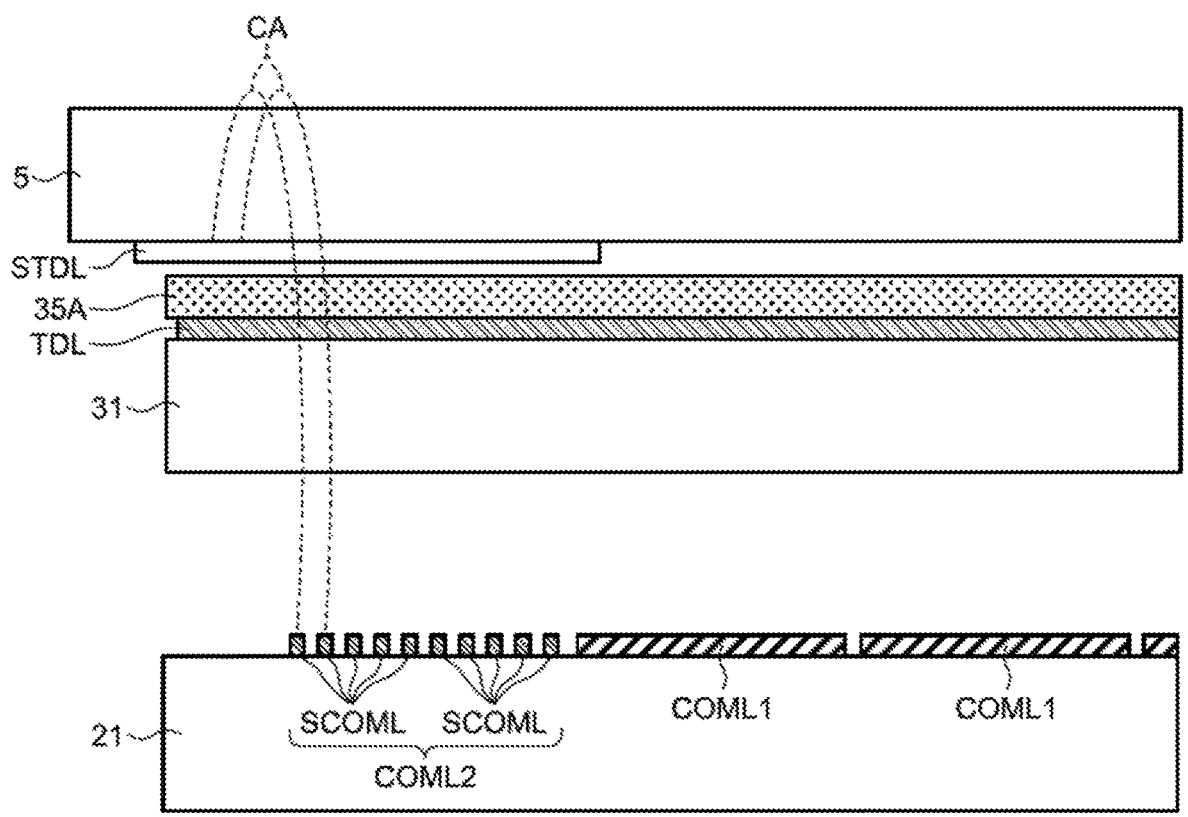
FIG. 15 is a schematic B-B cross-sectional view illustrating a configuration related to touch detection and a polarizing plate in a simplified manner in a configuration of the area A illustrated in FIG. 10.

Next, the following describes a configuration related to fingerprint detection. FIG. 14 is an enlarged view of the area A illustrated in FIG. 10. FIG. 15 is a schematic B-B cross-sectional view illustrating a configuration related to touch detection and a polarizing plate in a simplified manner in a configuration of the area A illustrated in FIG. 10. Part or all (drive electrode COML2) of the drive electrodes COML include a plurality of subdivided electrodes SCOML that are subdivided at a finer pitch than an arrangement pitch of the drive electrodes COML. Specifically, as illustrated in FIG. 14, for example, one drive electrode COML2 among the drive electrodes COML arranged in parallel with each other is subdivided into some subdivided electrodes SCOML at a finer pitch than the arrangement pitch of the drive electrodes COML. More specifically, for example, when the arrangement pitch of the drive electrodes COML is 3 mm to 5 mm, the arrangement pitch of the subdivided electrodes SCOML is 50 μm to 300 μm. An arrangement direction of the subdivided electrodes SCOML is the same as an arrangement direction of the drive electrodes COML.

A width of the region in which the subdivided electrodes SCOML of one drive electrode COML2 are arranged in parallel with each other is substantially the same as that of the drive electrode COML1 not including the subdivided electrode SCOML. In other words, by bundling all the subdivided electrodes SCOML, the drive electrode COML2 including the subdivided electrodes SCOML can obtain substantially the same electrode width as that of the drive electrode COML1 not including the subdivided electrode SCOML.

In FIG. 14, one drive electrode COML2 including the subdivided electrodes SCOML is the lowermost drive electrode COML in FIG. 10, and is the drive electrode COML positioned at a lower part of the display region of an electronic apparatus including the display device 1 with a touch detection function, for example. However, such a specific configuration is merely an arrangement example of the drive electrode COML2 including the subdivided electrode SCOML, and can be appropriately modified. For example, one or more of the drive electrodes COML1 that are not subdivided in FIG. 14 may be subdivided into some pieces to include the subdivided electrodes SCOML, or all the drive electrodes COML may be the drive electrodes COML2 including the subdivided electrodes SCOML.

The display device 1 with a touch detection function includes the second touch detection electrode STDL. Specifically, as illustrated in FIG. 14, for example, the second touch detection electrodes STDL are arranged in parallel with each other between the first touch detection electrodes TDL that are arranged in parallel with each other. The second touch detection electrodes STDL are subdivided at a finer pitch than the arrangement pitch of the first touch detection electrodes TDL. More specifically, for example, when the arrangement pitch of the first touch detection electrodes TDL is 3 mm to 5 mm, the arrangement pitch of the second touch detection electrodes STDL is 50 μm to 300 μm. The arrangement direction of the second touch detection electrodes STDL is the same as the arrangement direction of the first touch detection electrodes TDL.

In FIG. 14 and other figures, to clearly illustrate that one drive electrode COML2 having the width corresponding to one drive electrode COML1 has a plurality of subdivided electrodes SCOML, the width of the subdivided electrode SCOML is substantially equal to spacing (a width) between the subdivided electrodes SCOML. However, this is merely a schematic, and does not represent an actual width. It is only required that the subdivided electrodes SCOML are separated or insulated from each other such that each of the subdivided electrodes SCOML can receive individually the drive signal Vcom. A relation between the width of each second touch detection electrode STDL and the spacing between the second touch detection electrodes STDL is the same as the relation between the width of each subdivided electrode SCOML and the spacing between the subdivided electrodes SCOML.

The second touch detection electrode STDL is arranged in a partial region of the detection region. Specifically, as illustrated in FIG. 14, for example, the second touch detection electrode STDL is arranged in a region between some (for example, four) of the first touch detection electrodes TDL present around a middle position in the detection region in the arrangement direction of the first touch detection electrode TDL. More specifically, the second touch detection electrode STDL is arranged in a region between two first touch detection electrodes TDL included in the some of the first touch detection electrodes TDL and in which the first touch detection electrode TDL is not present.

The second touch detection electrode STDL is arranged at a portion not in contact with the subdivided electrode SCOML and where the second touch detection electrode STDL forms capacitance with the subdivided electrode SCOML to which the drive signal Vcom is output. Specifically, as illustrated in FIG. 15, for example, the second touch detection electrode STDL is arranged on the cover member 5 that is arranged facing the pixel substrate 2 including the drive electrode COML with the liquid crystal layer 6 and the counter substrate 3 interposed therebetween. More specifically, the second touch detection electrode STDL is arranged on the first surface of the cover member 5 facing the counter substrate 3. The drive electrodes COML (drive electrodes COML1 and COML2) and the first touch detection electrodes TDL are arranged on a side of the second surface of the cover member 5 with which a touch operation is performed. The drive electrodes COML and the first touch detection electrodes TDL are included in the respective substrates (the pixel substrate 2 and the counter substrate 3) to form a multilayer structure. The second touch detection electrode STDL is arranged closer to the cover member 5 than the first touch detection electrode TDL is.

As illustrated in FIG. 14, the second touch detection electrode STDL is located at a portion overlapping the subdivided electrode SCOML in a plan view. The second touch detection electrode STDL arranged at such a portion is located at a portion not in contact with the subdivided electrode SCOML. The second touch detection electrode STDL arranged at such a portion forms capacitance with the subdivided electrode SCOML to which the drive signal Vcom is output. In FIG. 15 and other figures, the capacitance formed by combining the second touch detection electrode STDL and the subdivided electrode SCOML is schematically illustrated by a dashed line CA. In FIG. 15 and other figures, although only the capacitance for two subdivided electrodes SCOML is exemplified, the capacitance is similarly generated for the other subdivided electrodes SCOML.

The subdivided electrode SCOML and the second touch detection electrode STDL having the positional relation described above have a configuration for performing touch detection based on the same principle as that of the drive electrode COML and the first touch detection electrode TDL. The arrangement pitch of the subdivided electrodes SCOML is finer than that of the drive electrodes COML. The arrangement pitch of the second touch detection electrodes STDL is finer than that of the first touch detection electrodes TDL. Thus, touch detection can be performed with higher resolution. That is, it is possible to output a detection result in which contact and non-contact on the cover member 5 caused by minute roughness such as a fingerprint are distinguished from each other (refer to FIG. 9).

The arrangement of the first touch detection electrodes TDL and the second touch detection electrodes STDL is determined based on a relation (interference and the like) between a sensor function implemented by the first touch detection electrode TDL and the drive electrode COML and a sensor function implemented by the second touch detection electrode STDL and the subdivided electrode SCOML. Specifically, as illustrated in FIG. 14, for example, the first touch detection electrode TDL and the second touch detection electrode STDL are arranged at the respective portions not overlapping each other in a plan view. This configuration can prevent one of the first touch detection electrode TDL and the second touch detection electrode STDL from being arranged at a portion interposed between the other one thereof and the drive electrode COML. Thus, the display device 1 with a touch detection function can favorably exhibit both sensor functions. For example, by causing the spacing between the first touch detection electrode TDL and the second touch detection electrode STDL to be larger than the spacing between the second touch detection electrodes STDL, a possibility of interference between an electric field formed between the first touch detection electrode TDL and the drive electrode COML and an electric field formed between the second touch detection electrode STDL and the subdivided electrode SCOML can be further reduced. Thus, the display device 1 with a touch detection function can favorably exhibit both sensor functions. The arrangement of the first touch detection electrode TDL and the second touch detection electrode STDL can be appropriately modified based on other reasons.

Figure 16:
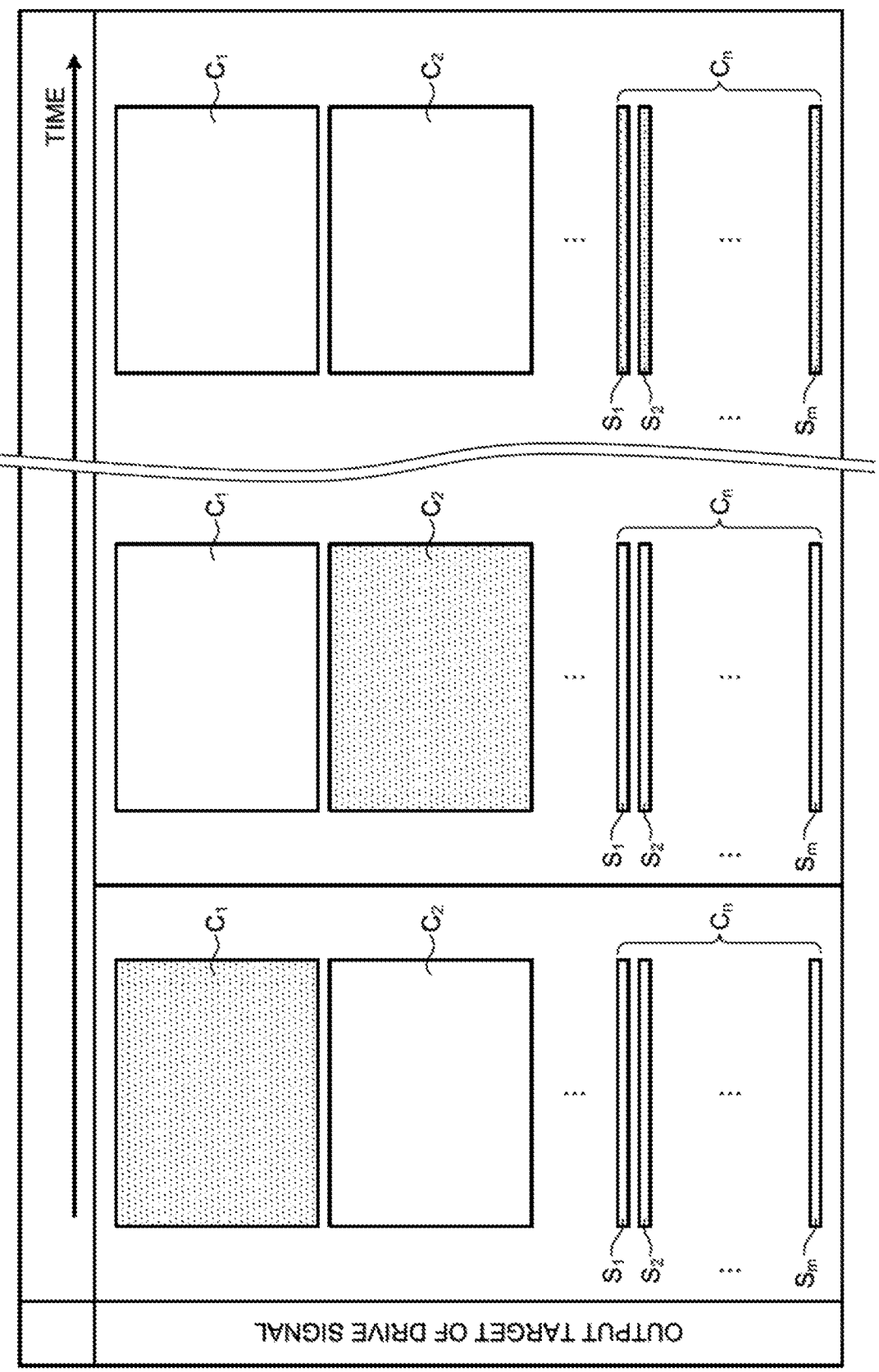
FIG. 16 is a schematic diagram illustrating an example of transition of the drive electrode to which the drive signal is output in a first mode in the display device with a touch detection function.
Figure 17:
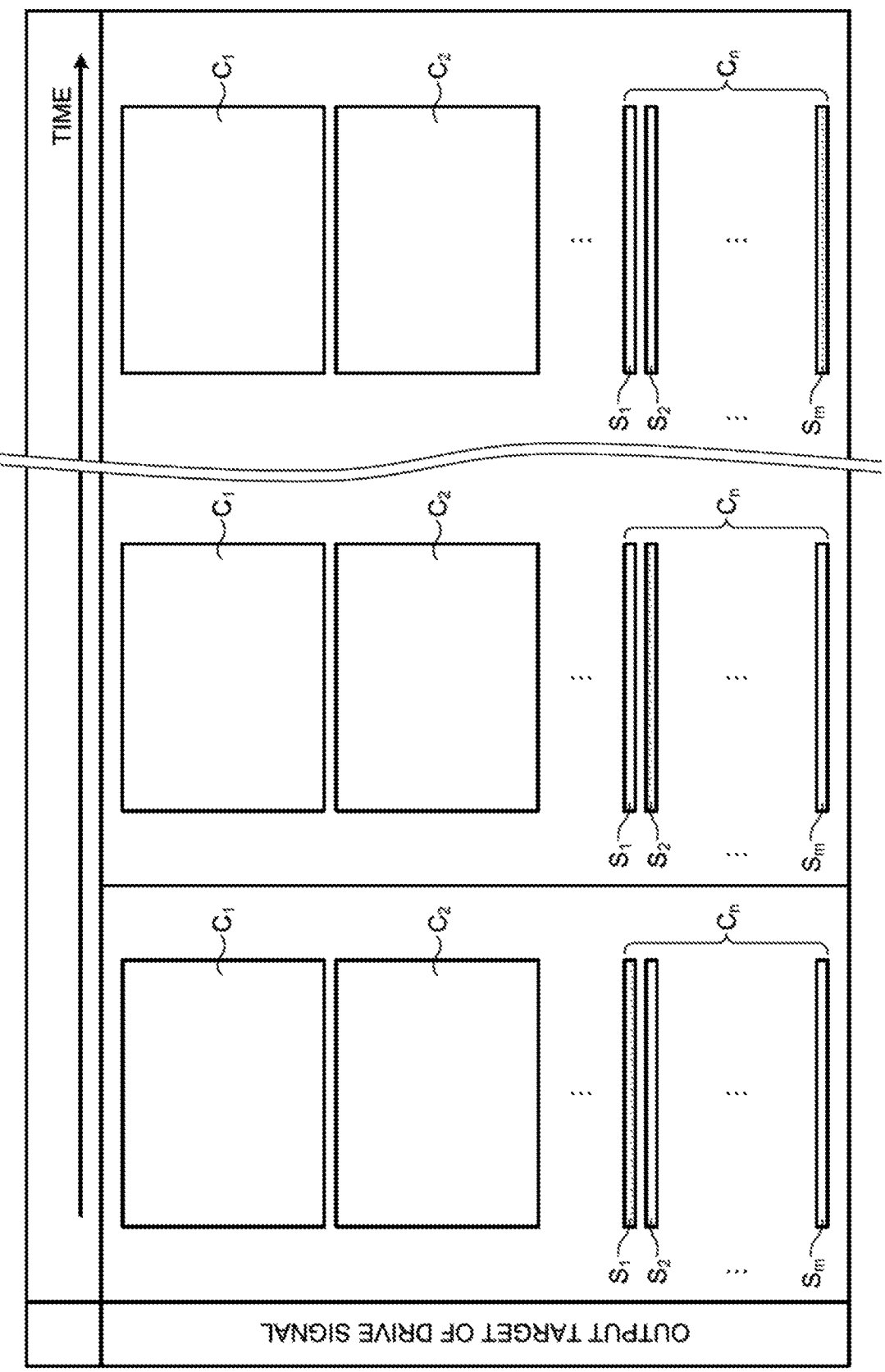
FIG. 17 is a schematic diagram illustrating an example of transition of a subdivided electrode to which the drive signal is output in a second mode in the display device with a touch detection function.

FIG. 16 is a schematic diagram illustrating an example of transition of the drive electrode COML to which the drive signal Vcom is output in the first mode in the display device 1 with a touch detection function. The display device 1 with a touch detection function operates in the first mode when performing touch detection using the first touch detection electrode TDL. A purpose of touch detection using the first touch detection electrode TDL is to detect a position of a touch operation in the detection region, such as a position of a finger of a person in the detection region. In FIG. 16 and FIG. 17 described later, the drive electrodes are denoted by reference numerals $C_1, C_2, \ldots, C_n$ to distinguish the drive electrodes COML from each other. The subdivided electrodes SCOML are denoted by reference numerals $S_1, S_2, \ldots, S_m$ to distinguish the subdivided electrodes SCOML from each other.

In the first mode, the drive signal Vcom is output in units of the drive electrode COML. Specifically, as illustrated in FIG. 16, for example, the drive signal Vcom is output to scan the drive electrodes $C_1, C_2, \ldots, C_n$ arranged in parallel with each other. During the scanning, the drive signal Vcom is output to each of the drive electrodes COML in succession at a predetermined cycle. Irrespective of whether the drive electrode COML includes the subdivided electrode SCOML, the drive signal Vcom is output in units of the drive electrode COML. That is, regarding one drive electrode COML2($C_n$) including the subdivided electrodes SCOML, the drive signal Vcom is output to all of the subdivided electrodes SCOML included in the one drive electrode COML2 at the same time. The width of the region in which the subdivided electrodes SCOML of one drive electrode COML2 are arranged in parallel with each other is substantially equal to that of the drive electrode COML1 not including the subdivided electrode SCOML. Thus, by outputting the drive signal Vcom to all of the subdivided electrodes SCOML included in one drive electrode COML2 at the same time, a touch detection range based on the detection block of the one drive electrode COML2 and a touch detection range based on the detection block in a case of outputting the drive signal Vcom to one drive electrode COML1 not including the subdivided electrode SCOML can be substantially equivalently handled.

FIG. 17 is a schematic diagram illustrating an example of transition of the subdivided electrode SCOML to which the drive signal Vcom is output in the second mode in the display device 1 with a touch detection function. The display device 1 with a touch detection function operates in the second mode when performing touch detection using the second touch detection electrode STDL. A purpose of touch detection using the second touch detection electrode STDL is to detect a shape of a detection target that is hardly detected with the arrangement pitch of the first touch detection electrodes TDL, such as a fingerprint of a finger of a person, in a region in which the second touch detection electrode STDL is arranged.

In the second mode, the drive signal Vcom is output in units of the subdivided electrode SCOML. Specifically, as illustrated in FIG. 17, for example, the drive signal Vcom is output to scan the subdivided electrodes $S_1, S_2, \ldots, S_m$ arranged in parallel with each other. During the scanning, the drive signal Vcom is output to each of the subdivided electrodes SCOML in succession at a predetermined cycle. In the present embodiment, in the second mode in which the drive signal Vcom is output in units of the subdivided electrode SCOML, the drive signal Vcom is not output to the drive electrode COML1 not including the subdivided electrode SCOML.

In this way, one drive electrode COML2 including the subdivided electrodes SCOML is provided such that switching is enabled between the first mode in which drive signal Vcom is collectively output to the subdivided electrodes SCOML of the one drive electrode COML2 and the second mode in which the drive signal Vcom is individually output to each subdivided electrode SCOML.

The drive electrode driver 14 functions as a drive circuit that switches between the first mode and the second mode to output the drive signal Vcom to the drive electrode COML. The drive electrode driver 14 according to the embodiment is configured to switch between the two modes, that is, the mode (first mode) in which the drive electrode driver 14 handles a plurality of subdivided electrodes SCOML as one drive electrode COML to collectively output the drive signal Vcom to the subdivided electrodes SCOML and the mode (second mode) in which the drive electrode driver 14 individually outputs the drive signal Vcom to each of the subdivided electrodes SCOML. Specifically, the drive electrode driver 14 is configured to switch an output target of the drive signal Vcom between units made up of a drive electrode and units made up of a subdivided electrode SCOML, using a shift register method, for example. The drive electrode driver 14 is capable of changing a voltage of the drive signal Vcom to an appropriate voltage for each of a case in which the output target of the drive signal Vcom is units made up of a drive electrode and a case in which the output target of the drive signal Vcom is units made up of a subdivided electrode SCOML.

In FIG. 16, the drive signal Vcom is output to one drive electrode COML at a time. However, the drive signal Vcom may be output to a plurality of drive electrodes COML at the same time. In such a case, the drive electrodes COML to which the drive signal Vcom is output make a transition at a predetermined cycle to perform scanning. The subdivided electrodes SCOML to which the drive signal Vcom is output at the same time in FIG. 17 are handled in the same manner as the drive electrodes COML.

Figure 18:
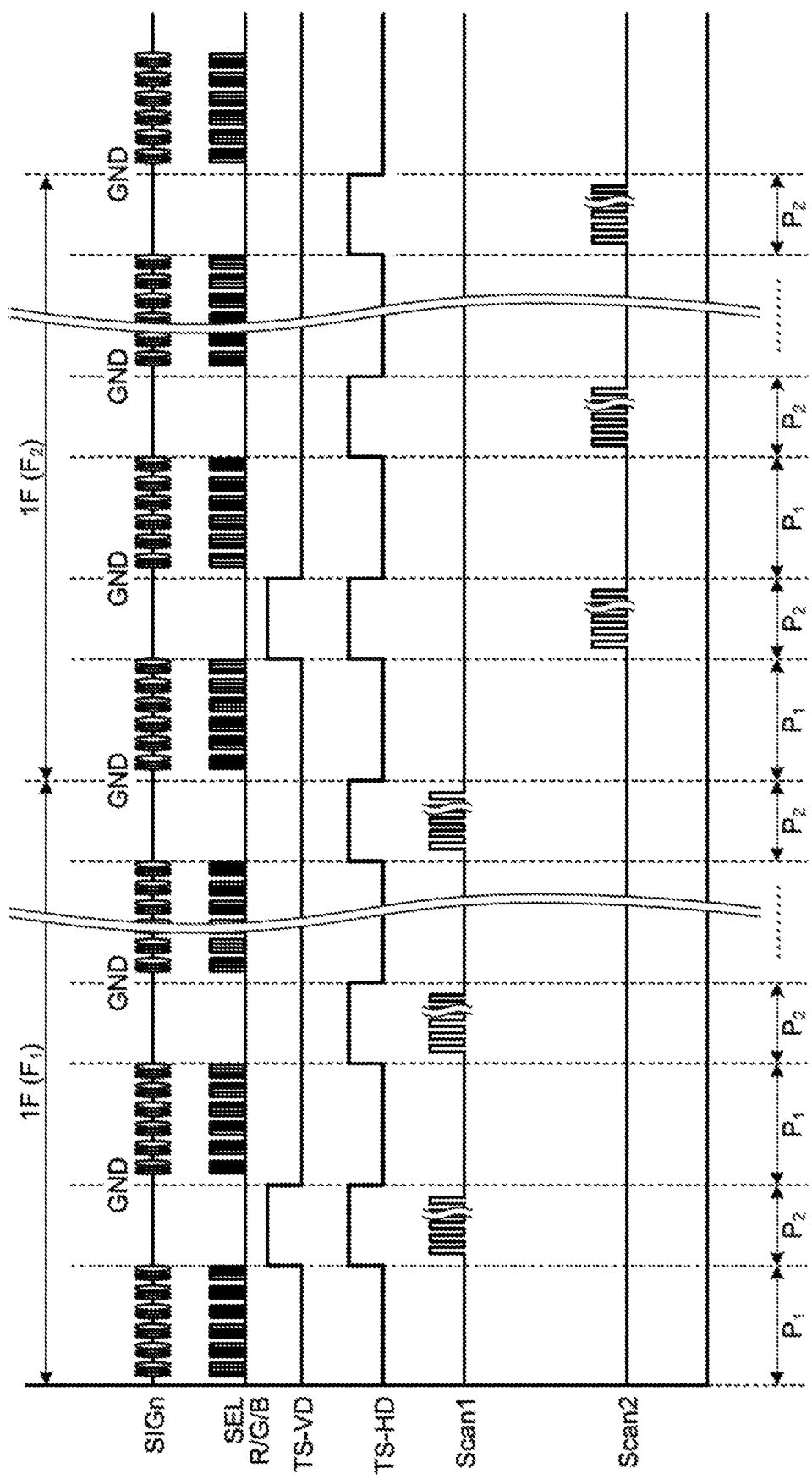
FIG. 18 is a timing chart illustrating an operation example of the display device with a touch detection function.
Figure 19:
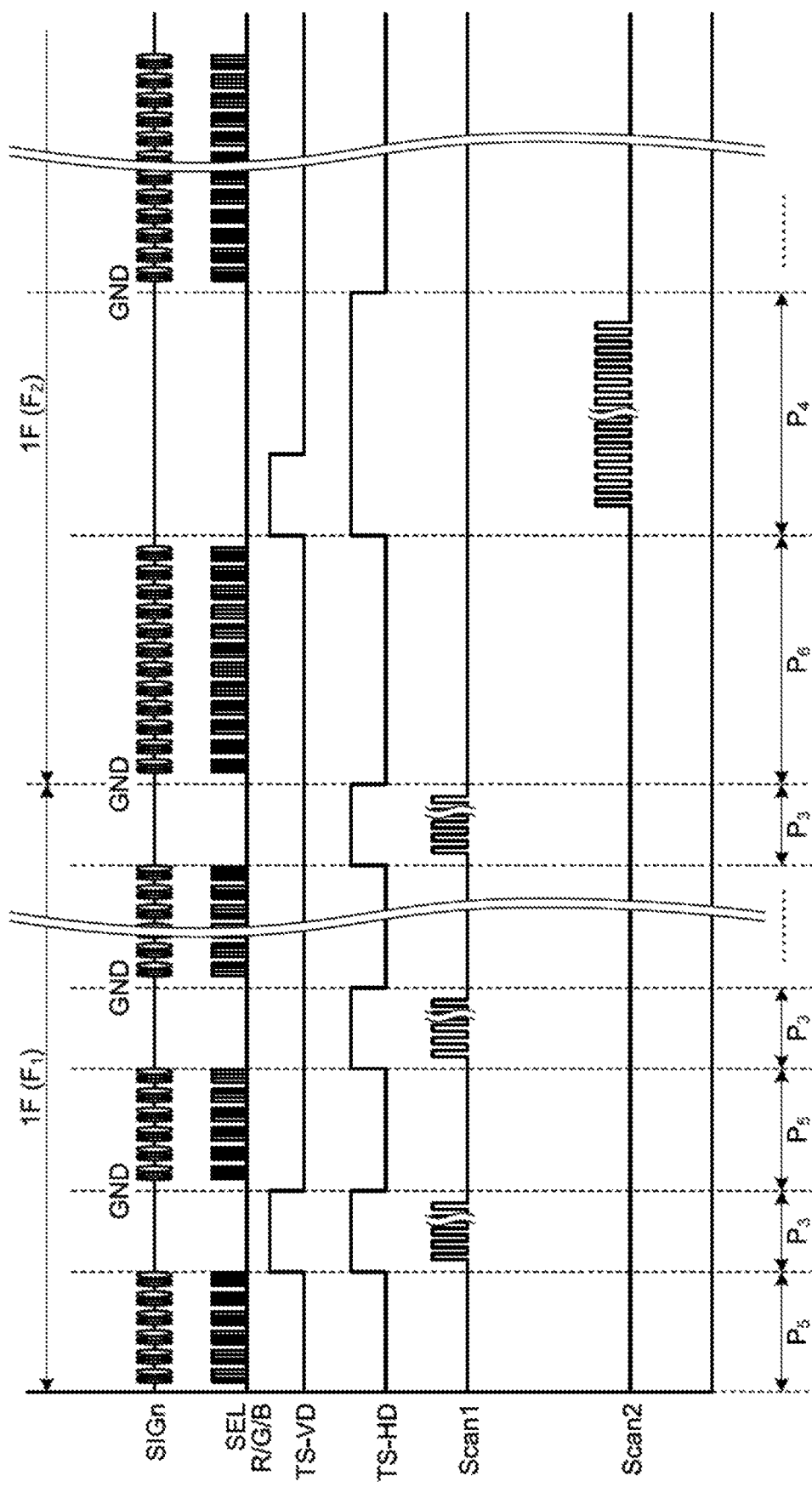
FIG. 19 is a timing chart illustrating another operation example of the display device with a touch detection function.

FIG. 18 is a timing chart illustrating an operation example of the display device 1 with a touch detection function. In FIG. 18 and FIG. 19 described later, Scan1 represents an output of the drive signal in the first mode. In FIG. 18 and FIG. 19, Scan2 represents an output of the drive signal in the second mode. In the embodiment, a display output period (period $P_1$) and a sensing period (period $P_2$) are alternately repeated in a time division manner. Specifically, as illustrated in FIG. 18, for example, the display device 1 with a touch detection function displays and outputs an image of one frame by a predetermined number of lines. In a period (frame period 1F) required to display the entire image of one frame, the period $P_1$ in which the image corresponding to the predetermined number of lines is displayed and the period $P_2$ in which sensing using any one of the first touch detection electrode TDL and the second touch detection electrode STDL is performed are alternately repeated.

More specifically, in accordance with an output timing (refer to the line SIGn) of the pixel signals Vpix corresponding to the predetermined number of lines in the period $P_1$, display output is performed with the pixels Pix corresponding to the lines (refer to the line SEL R/G/B). The period $P_2$ is a period between output timings of pixel signals Vpix corresponding to the predetermined number of lines. The line TS-VD in the period $P_2$ represents a timing of vertical synchronization control for sensing, and the line TS-HD represents a timing of horizontal synchronization control for sensing. In the embodiment, sensing starts in accordance with a rising timing of the line TS-VD, and the drive signal Vcom for sensing is output in a rising period of the line TS-HD.

At an output timing of the drive signal Vcom in the period $P_2$, sensing is performed using the first touch detection electrode TDL or the second touch detection electrode STDL. In the example illustrated in FIG. 18, the display device 1 with a touch detection function performs touch detection using the first touch detection electrode TDL, what is called position detection of a touch operation in the detection region, in the frame period 1F of the first frame ($F_1$). In the touch detection using the first touch detection electrode TDL, the drive signal Vcom is output in units of the drive electrode COML. The display device 1 with a touch detection function performs touch detection using the second touch detection electrode STDL, such as fingerprint detection, in the frame period 1F of the second frame (F2). In the touch detection using the second touch detection electrode STDL, the drive signal Vcom is output in units of the subdivided electrode SCOML.

FIG. 19 is a timing chart illustrating another operation example of the display device 1 with a touch detection function. In the example described with reference to FIG. 18, the period $P_2$ in which the first touch detection electrode TDL is used and the period $P_2$ in which the second touch detection electrode STDL is used have the same period length. However, the periods may have different period lengths. For example, one rising period (period $P_4$) of the line TS-HD in a case of using the second touch detection electrode STDL may be longer than one rising period (period $P_3$) of the line TS-HD in a case of using the first touch detection electrode TDL. Specifically, as illustrated in FIG. 19, for example, the period $P_4$ may be an integral multiple (for example, two times) of the period $P_3$. In this case, a relation between the period $P_4$ and the period $P_3$ may correspond to a relation between the lengths of the periods (periods $P_6$ and $P_5$) for display output performed alternately with sensing. Specifically, as illustrated in FIG. 19, for example, a ratio between the period $P_4$ and the period $P_3$ may be equal to a ratio between the period $P_6$ for display output in the frame period 1F (F2) including the period $P_4$ and the period $P_5$ for display output in the frame period 1F (F1) including the period $P_3$ (for example, 2:1).

The drive electrode driver 14, the first touch detection unit 40, and the second touch detection unit 60 operate in a predetermined routine to perform processing related to display output and sensing. Specifically, the drive electrode driver 14, the first touch detection unit 40, and the second touch detection unit 60 perform processing related to display output and sensing by time division control described above with reference to FIG. 18 or FIG. 19, for example. A switching timing between the period for display output and the period for sensing depends on the clock signal output from the control unit 11, for example.

The second touch detection unit 60 performs various pieces of processing related to fingerprint detection with the subdivided electrode SCOML and the second touch detection electrode STDL. Specifically, for example, the synthesizing unit 67 combines the second touch detection signals Vdet2 from the second touch detection electrodes STDL to generate two-dimensional information indicating the shape of the external proximity object performing a touch operation with the second touch detection electrode STDL. In this way, based on variation in capacitance at the second touch detection electrode STDL, the second touch detection unit 60 outputs a detection result corresponding to roughness of the object performing a touch operation.

A method of determining which one of the first touch detection electrode TDL and the second touch detection electrode STDL is used for sensing is freely predetermined. For example, it may be predetermined through control by the control unit 11. Specifically, for example, the control unit 11 receives, from an external circuit, the control signal (the fingerprint-detection implementation signal Vtouch) indicating implementation of fingerprint detection. The control unit 11 causes the drive electrode driver 14 to output the drive signal Vcom in units of the subdivided electrode SCOML in a period in which a flag of the fingerprint-detection implementation signal Vtouch is ON, and causes the drive electrode driver 14 to output the drive signal Vcom in units of the drive electrode COML in a period in which the flag of the fingerprint-detection implementation signal Vtouch is OFF. With such a mechanism, the electronic apparatus including the display device 1 with a touch detection function can perform fingerprint detection at a desired timing if application software and the like including control functions related to ON/OFF of the output of the fingerprint-detection implementation signal Vtouch are installed thereon, for example. The electronic apparatus can perform switching, at a desired timing, between position detection of the touch operation in the detection region and fingerprint detection.

The display device 1 with a touch detection function may perform display output for prompting fingerprint detection in the frame period 1F including the sensing period in which touch detection is performed using the second touch detection electrode STDL. Specifically, for example, in a period in which the application software described above causes the fingerprint-detection implementation signal Vtouch to be ON, the display device 1 with a touch detection function can perform such display output by outputting the video signal Vdisp for displaying an image suggesting that the region in which the second touch detection electrode STDL is arranged is touched by a finger.

In the description with reference to FIG. 18 and FIG. 19, switching between sensing using the first touch detection electrode TDL and sensing using the second touch detection electrode STDL is performed on a frame-period-by-frame-period basis. However, the timing of switching is not limited thereto and can be appropriately modified. For example, the period of sensing using the first touch detection electrode TDL and the period of sensing using the second touch detection electrode STDL may be included in the same frame period 1F.

As described above, according to the embodiment, one drive electrode COML2 including a plurality of subdivided electrodes SCOML is provided such that switching is enabled between the first mode in which the drive signal Vcom is collectively output to the subdivided electrodes SCOML of the one drive electrode COML2 and the second mode in which the drive signal Vcom is individually output to each of the subdivided electrodes SCOML. Due to this, touch detection corresponding to an arrangement pitch of a target to which the drive signal Vcom is output can be selectively used in the first mode and the second mode. For example, the drive electrode COML2 including the subdivided electrode SCOML can be used in both of the first mode for mainly performing position detection of a touch operation in the detection region and the second mode for mainly performing detection with higher resolution than that of the position detection (for example, detection of the shape (pattern) of the fingerprint). Thus, a dedicated drive electrode used only for the second mode is not required. Accordingly, the detection region with higher resolution used for detecting the fingerprint and the like can also be used as the detection region of the touch operation. The position detection and the detection with higher resolution than that of the position detection can be performed with a smaller number of components.

The display device 1 with a touch detection function includes the second touch detection electrode STDL arranged in a partial region of the detection region. The second touch detection electrode STDL is arranged at a portion not in contact with the subdivided electrode SCOML and where the second touch detection electrode STDL forms capacitance with the subdivided electrode SCOML to which the drive signal Vcom is output. Due to this, the detection region with higher resolution used for detecting the fingerprint and the like can also be used as the detection region of the touch operation.

The display device 1 with a touch detection function includes a plurality of second touch detection electrodes STDL. Due to this, detection can be performed with higher accuracy using the second touch detection electrodes STDL.

The second touch detection electrodes STDL are arranged at a pitch finer than the arrangement pitch of the first touch detection electrodes TDL. Due to this, resolution of detection using the second touch detection electrodes STDL can be caused to be higher than resolution of detection using the first touch detection electrode TDL.

The second touch detection electrode STDL is arranged closer to the cover member than the first touch detection electrode TDL is. Due to this, sensitivity of touch detection with the second touch detection electrode can be easily enhanced.

Modification

The arrangement of each component in the embodiment of the present invention can be appropriately modified. The following describes modifications of the embodiment with reference to FIGS. 20 to 31.

First Modification

Figure 20:
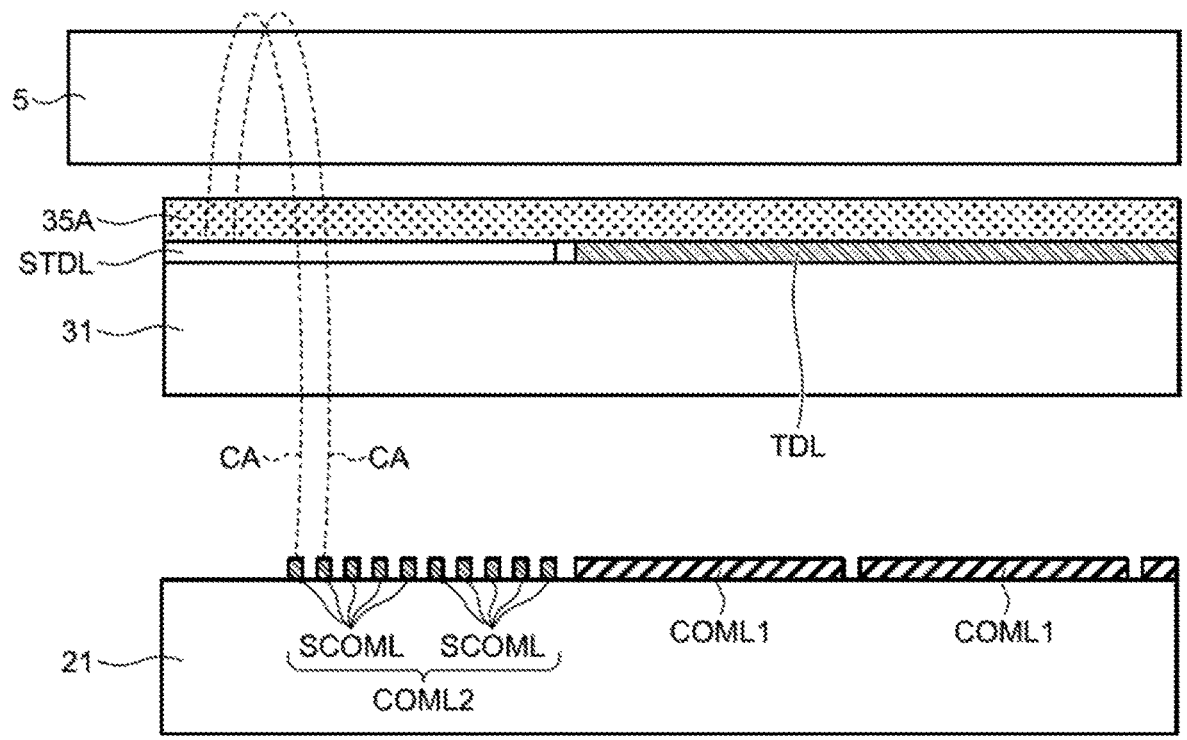
FIG. 20 is a cross-sectional view illustrating a positional relation between a drive electrode, a subdivided electrode, a first touch detection electrode, a second touch detection electrode, and the like according to a first modification of the embodiment.

FIG. 20 is a cross-sectional view illustrating a positional relation between the drive electrodes COML1 and COML2, the subdivided electrode SCOML, the first touch detection electrode TDL, the second touch detection electrode STDL, and the like according to a first modification of the embodiment. In FIG. 15, the cover member 5 has the first surface facing the counter substrate 3 and the second surface opposite to the first surface. The touch operation is performed with the second surface. The second touch detection electrode STDL is arranged on the first surface of the cover member 5. Alternatively, the second touch detection electrode STDL may be arranged at another portion. For example, as illustrated in FIG. 20, the second touch detection electrode STDL may be arranged in the same layer as the first touch detection electrode TDL. The first touch detection electrode TDL and the second touch detection electrode STDL can be collectively formed through one process when they are to be arranged in the same layer.

Second Modification

Figure 21:
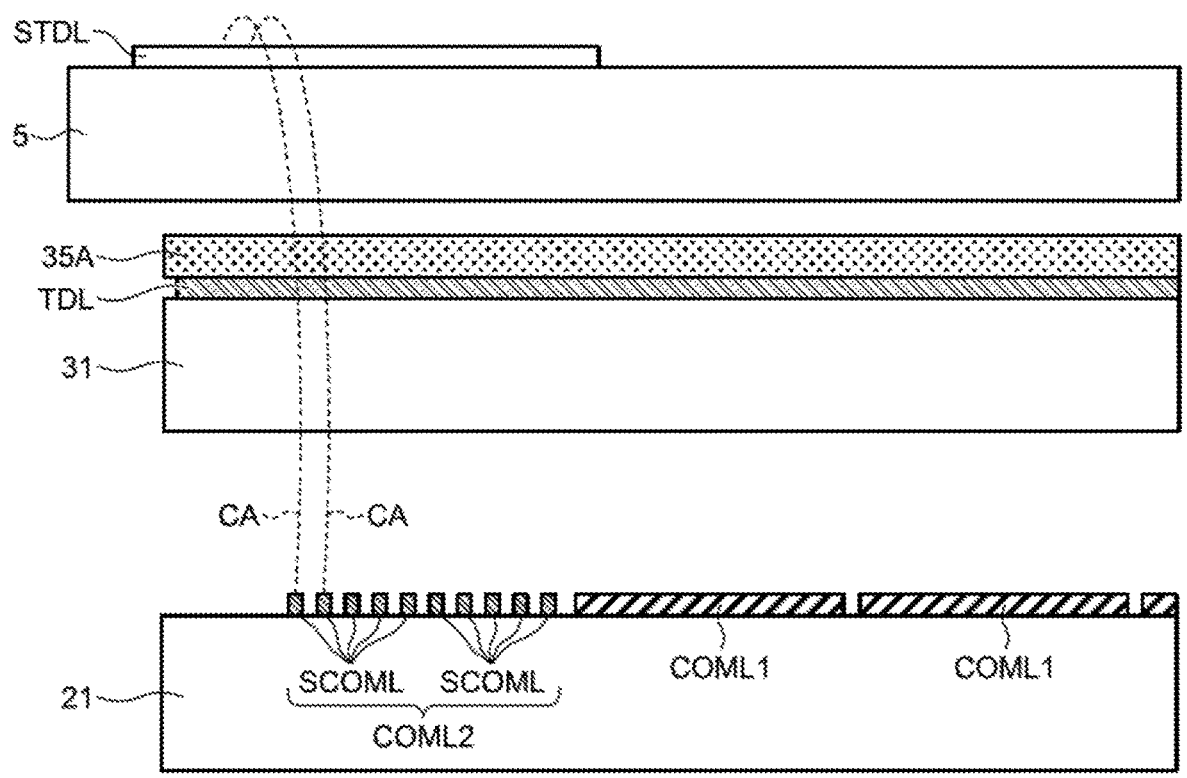
FIG. 21 is a cross-sectional view illustrating a positional relation between a drive electrode, a subdivided electrode, a first touch detection electrode, a second touch detection electrode, and the like according to a second modification of the embodiment.

FIG. 21 is a cross-sectional view illustrating a positional relation between the drive electrodes COML1 and COML2, the subdivided electrode SCOML, the first touch detection electrode TDL, the second touch detection electrode STDL, and the like according to a second modification of the embodiment. As illustrated in FIG. 21, the second touch detection electrode STDL may be arranged on the second surface of the cover member 5, the second surface is a surface with which the touch operation is performed by a finger and the like. Due to this, sensitivity of detection can be easily enhanced.

Third Modification

Figure 22:
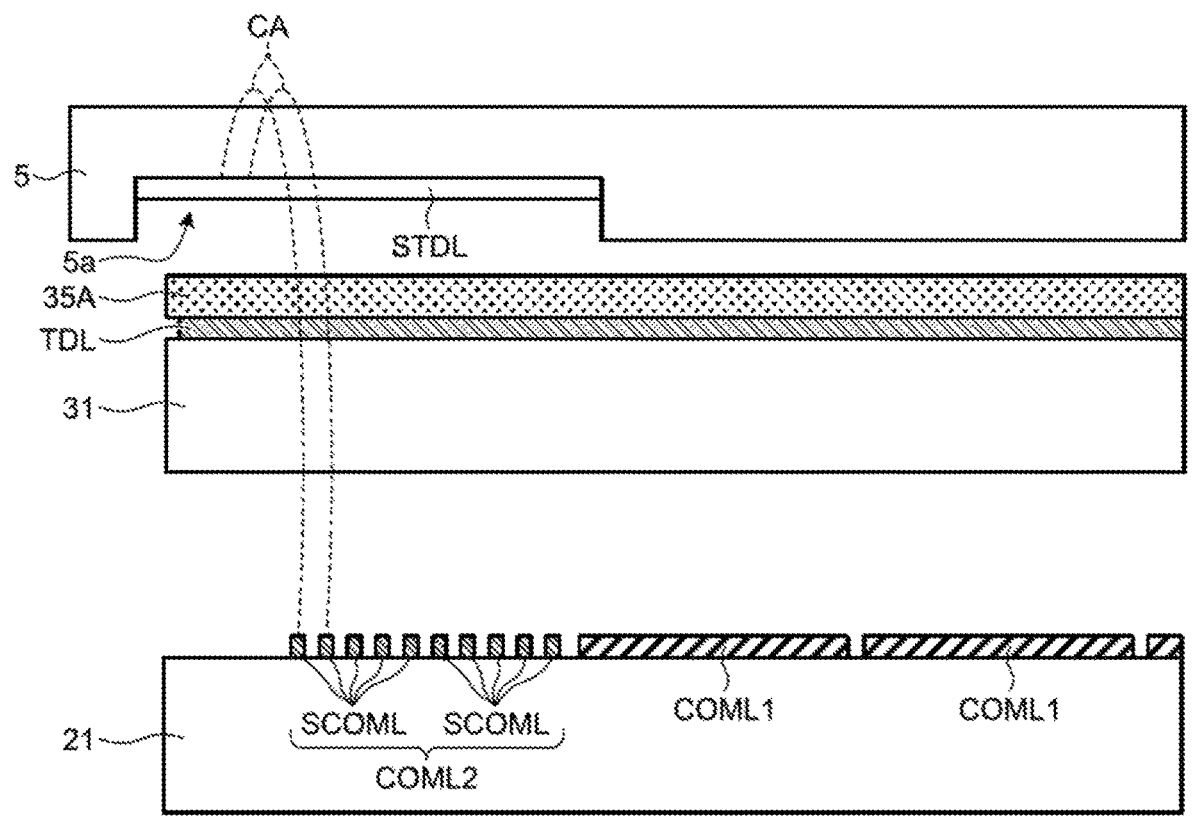
FIG. 22 is a cross-sectional view illustrating a positional relation between a drive electrode, a subdivided electrode, a first touch detection electrode, a second touch detection electrode, and the like according to a third modification of the embodiment.

FIG. 22 is a cross-sectional view illustrating a positional relation between the drive electrodes COML1 and COML2, the subdivided electrode SCOML, the first touch detection electrode TDL, the second touch detection electrode STDL, and the like according to a third modification of the embodiment. As illustrated in FIG. 22, the first surface of the cover member may have a stepped part 5a, the stepped part 5a being dented toward the second surface with which the touch operation is performed. The second touch detection electrode STDL is arranged on a bottom face of the stepped part 5a. In this way, the second touch detection electrode STDL may be located at a portion embedded in the cover member 5.

In the same manner as the embodiment, the second touch detection electrode STDL formed through the same process as that of printing of wiring on the substrate may be arranged on the stepped part 5a, or a film on which wiring that serves as the second touch detection electrode STDL is formed may be attached to the stepped part 5a.

Fourth Modification

Figure 23:
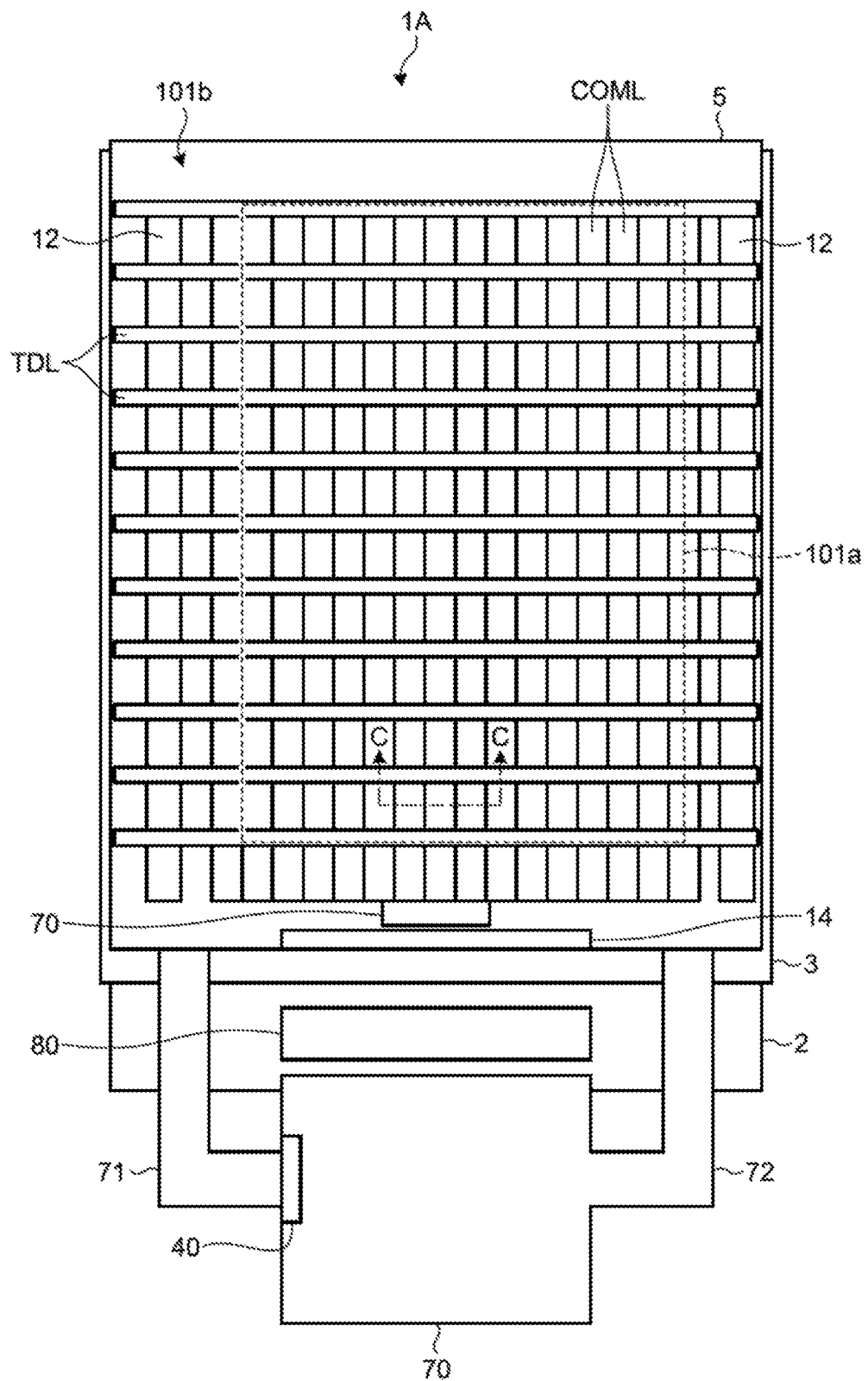
FIG. 23 is a plan view schematically illustrating the display device with a touch detection function according to a fourth modification of the embodiment.

FIG. 23 is a plan view schematically illustrating a display device 1A with a touch detection function according to a fourth modification of the embodiment. A positional relation between the drive electrode COML (and the subdivided electrode SCOML), the first touch detection electrode TDL (and the second touch detection electrode STDL), and the like in a plan view is not limited to the positional relation according to the embodiment, and can be appropriately modified. In the above embodiment, the first touch detection electrode TDL extends along the long side of the rectangular display region, and the drive electrode COML extends along the short side. Alternatively, as illustrated in FIG. 23, the long and short sides and the positional relation between the drive electrode COML and the first touch detection electrode TDL may be reversely combined. That is, in the display device 1A with a touch detection function, the drive electrode COML may extend along the long side of a rectangular region (for example, the display region) including the detection region, and the first touch detection electrode TDL may extend along the short side.

Figure 24:
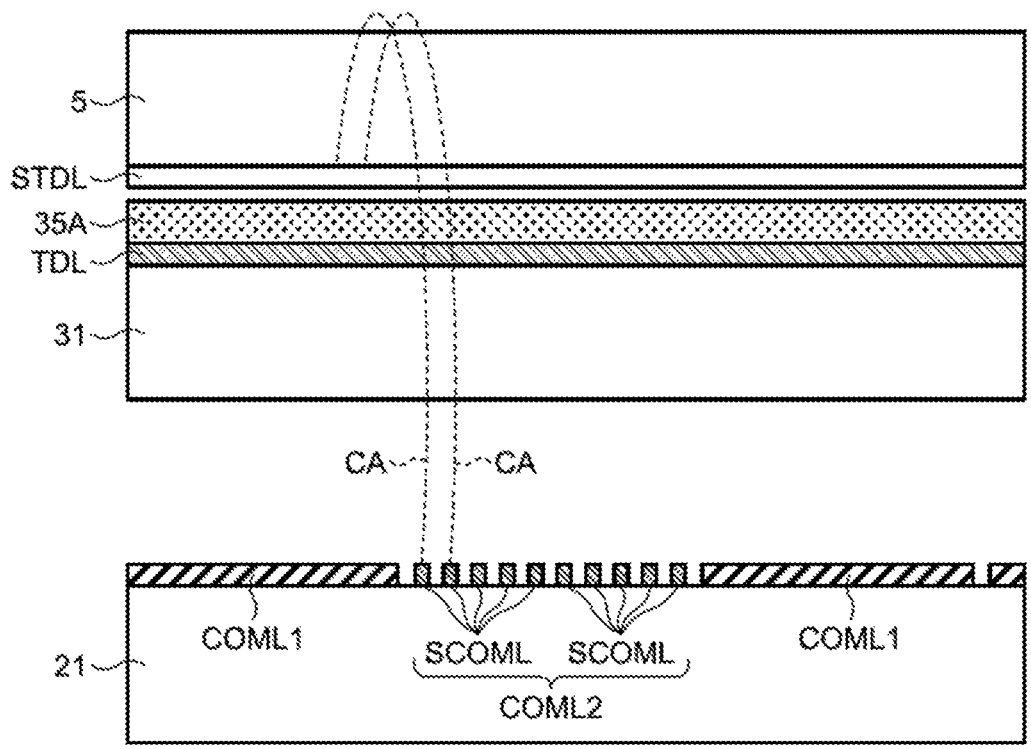
FIG. 24 is a C-C cross-sectional view illustrating a positional relation between a drive electrode, a subdivided electrode, a first touch detection electrode, a second touch detection electrode, and the like according to the fourth modification of the embodiment.

FIG. 24 is a C-C cross-sectional view illustrating a positional relation between the drive electrode COML, the subdivided electrode SCOML, the first touch detection electrode TDL, the second touch detection electrode STDL, and the like according to the fourth modification of the embodiment. The drive electrode COML2 including the subdivided electrode SCOML according to the fourth modification is arranged, for example, in the vicinity of the center in a direction along the short side of the rectangular display region. Accordingly, as illustrated in FIG. 24, the drive electrode COML2 including the subdivided electrode SCOML is arranged between the drive electrodes COML1.

Figure 25:
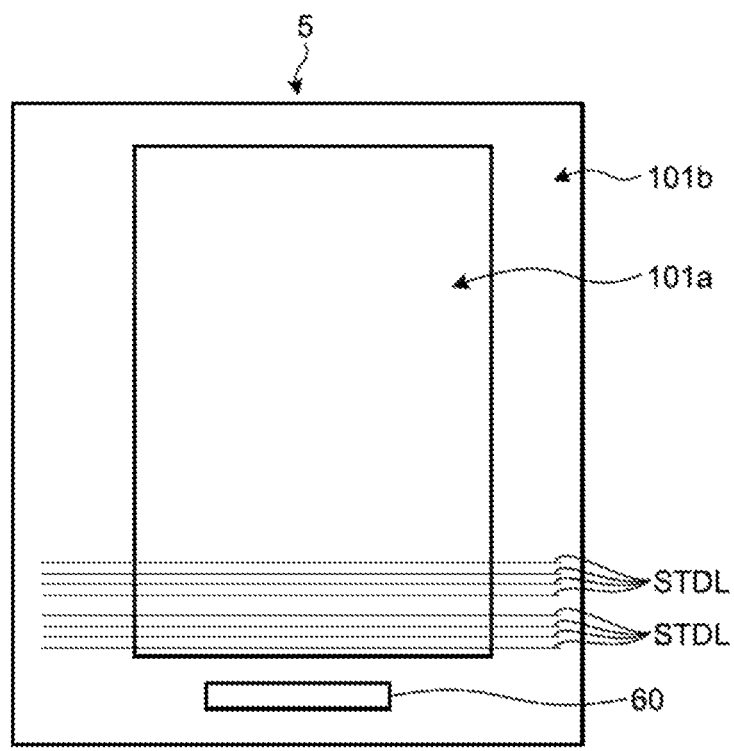
FIG. 25 is a diagram illustrating an example of a configuration arranged on a cover member according to the fourth modification.
Figure 26:
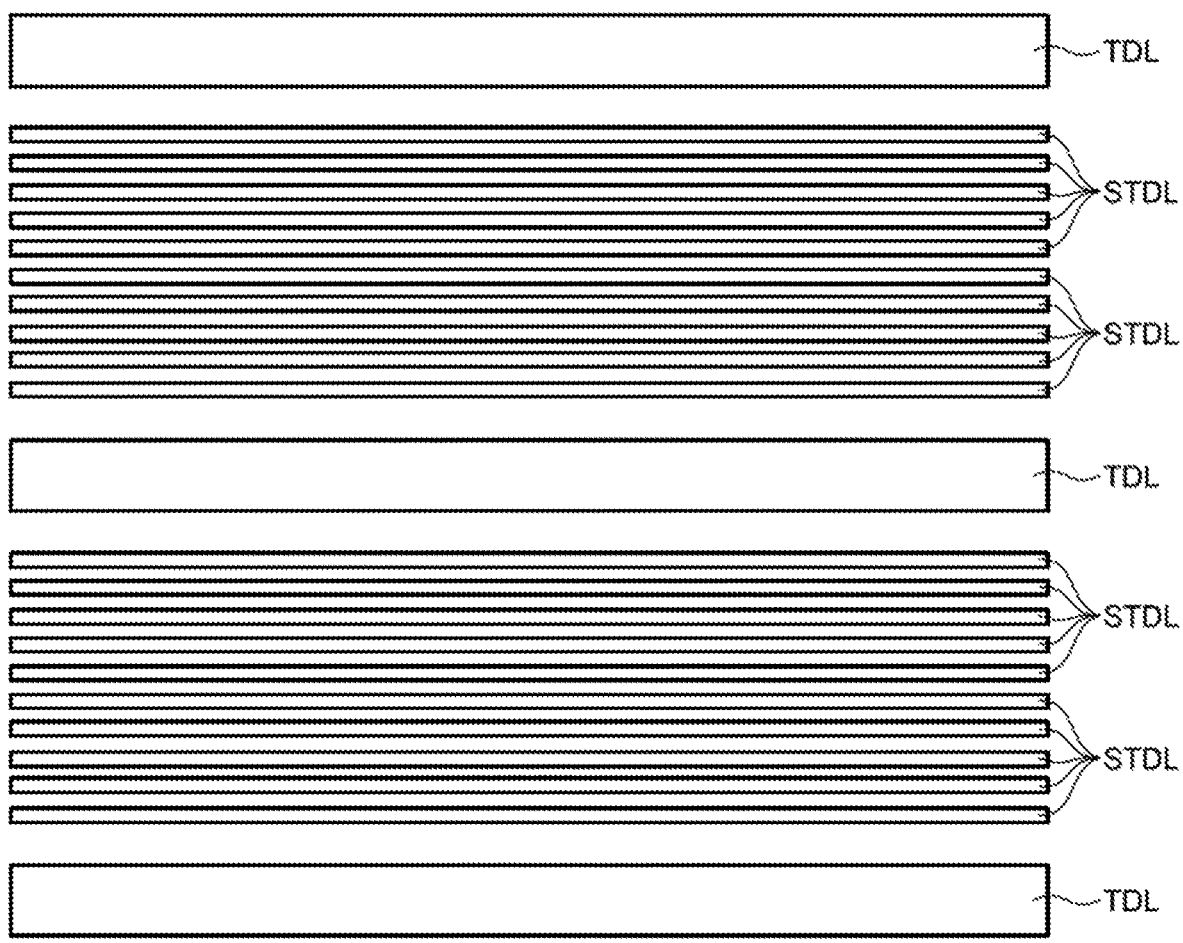
FIG. 26 is a plan view illustrating an example of a positional relation between the first touch detection electrode and the second touch detection electrode according to the fourth modification.

FIG. 25 is a diagram illustrating an example of a configuration arranged on the cover member 5 according to the fourth modification. FIG. 26 is a plan view illustrating an example of a positional relation between the first touch detection electrode TDL and the second touch detection electrode STDL according to the fourth modification. The second touch detection electrode STDL according to the fourth modification is arranged on the cover member 5 as illustrated in FIG. 25, for example. As illustrated in FIG. 26, the first touch detection electrode TDL on the counter substrate 3 and the second touch detection electrode STDL on the cover member 5 extend in the same direction (for example, a direction along the short side).

In FIG. 25, the second touch detection electrode STDL has a length across the entire short side of the display region. However, the length of the second touch detection electrode STDL can be appropriately modified. In the same manner as above embodiment, it is only required that the second touch detection electrode STDL is arranged in a partial region of the detection region, and at a portion not in contact with the subdivided electrode SCOML and where the second touch detection electrode STDL forms capacitance with the subdivided electrode SCOML to which the drive signal Vcom is output.

In the above embodiment, the second touch detection unit 60 is arranged on the FPC 70 extending toward the outside of the substrate, but this is merely an arrangement example of the second touch detection unit 60. The embodiment is not limited thereto, and can be appropriately modified. For example, as illustrated in FIG. 25, the second touch detection unit 60 may be arranged on the cover member 5. Specifically, for example, the second touch detection unit 60 may be arranged on the first surface of the cover member 5, which faces the counter substrate 3, in the same manner as the second touch detection electrode STDL illustrated in FIG. 24.

Figure 27:
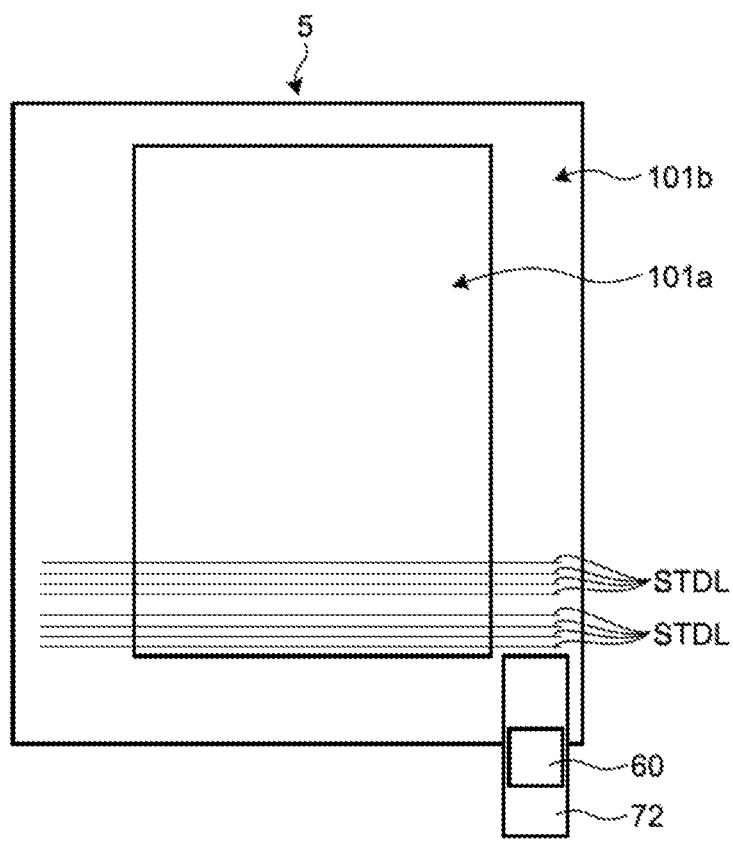
FIG. 27 is a diagram illustrating another example of arrangement of the second touch detection unit according to the fourth modification.

FIG. 27 is a diagram illustrating another example of arrangement of the second touch detection unit 60 according to the fourth modification. As illustrated in FIG. 27, the second touch detection unit 60 may be arranged on a wiring substrate such as an FPC (for example, the FPC 72) extending from the first surface of the cover member 5, which faces the counter substrate 3. According to the examples illustrated in FIGS. 25 and 27, in this case, formation of wiring that couples the second touch detection electrode STDL to the second touch detection unit 60 can be completed on the counter substrate 3 side of the cover member 5.

Although FIGS. 25 and 27 do not illustrate the wiring between the second touch detection electrode STDL and the second touch detection unit 60, actually, the wiring such as metal wiring is formed in the picture frame region 101b, and the wiring couples the second touch detection electrode STDL to the second touch detection unit 60.

Figure 28:
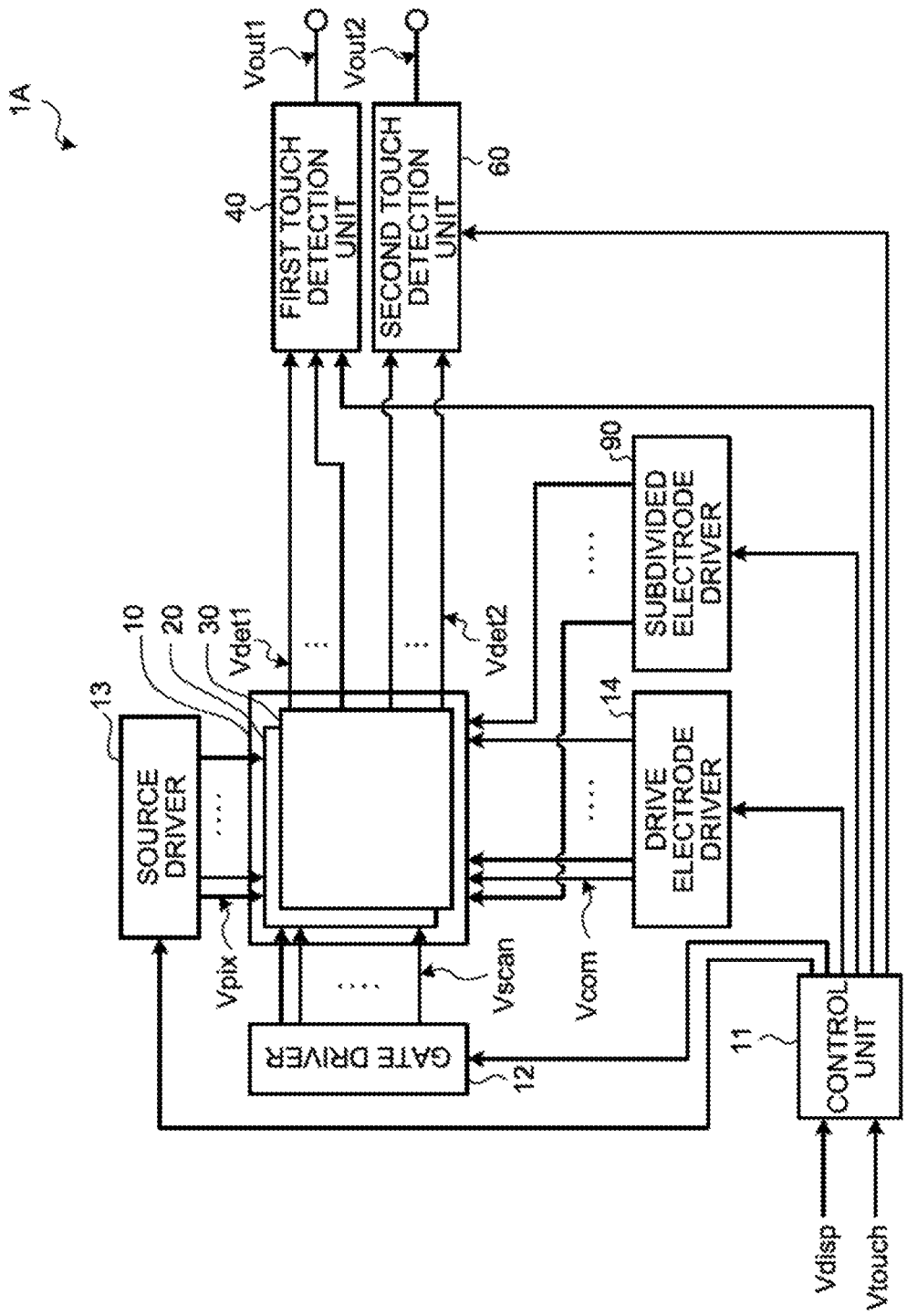
FIG. 28 is a block diagram illustrating a configuration example of the display device with a touch detection function according to the fourth modification.

FIG. 28 is a block diagram illustrating a configuration example of the display device 1A with a touch detection function according to the fourth modification. In the above embodiment, the single drive electrode driver 14 outputs the drive signal Vcom to each individual drive electrode COML and to each individual subdivided electrode SCOML. Alternatively, a configuration of outputting the drive signal Vcom to each individual drive electrode COML in the first mode may be separated from a configuration of outputting the drive signal Vcom to each individual subdivided electrode SCOML in the second mode. Specifically, as illustrated in FIGS. 23 and 28, for example, the drive electrode driver 14 that outputs the drive signal Vcom to each individual drive electrode COML and a subdivided electrode driver 90 that outputs the drive signal Vcom to each individual subdivided electrode SCOML may be separately provided. In this case, the subdivided electrode driver 90 is coupled to each the subdivided electrodes SCOML of the drive electrode COML2, so that the subdivided electrode driver 90 individually outputs the drive signal Vcom to each of the subdivided electrodes SCOML. The subdivided electrode driver 90 is, for example, what is called a scanning circuit, and successively switches the subdivided electrode SCOML to which the drive signal Vcom is output in response to the clock signal.

The drive electrode driver 14 and the subdivided electrode driver 90 that are separately provided as illustrated in the examples of FIGS. 23 and 28 determine a state of an output of the drive signal Vcom for touch detection under control of the control unit 11, for example. Specifically, in the first mode, the control unit 11 causes the drive electrode driver 14 to output the drive signal Vcom to each individual drive electrode COML. In the second mode, the control unit 11 causes the subdivided electrode driver 90 to output the drive signal Vcom to each individual subdivided electrode SCOML.

Fifth Modification

Figure 29:
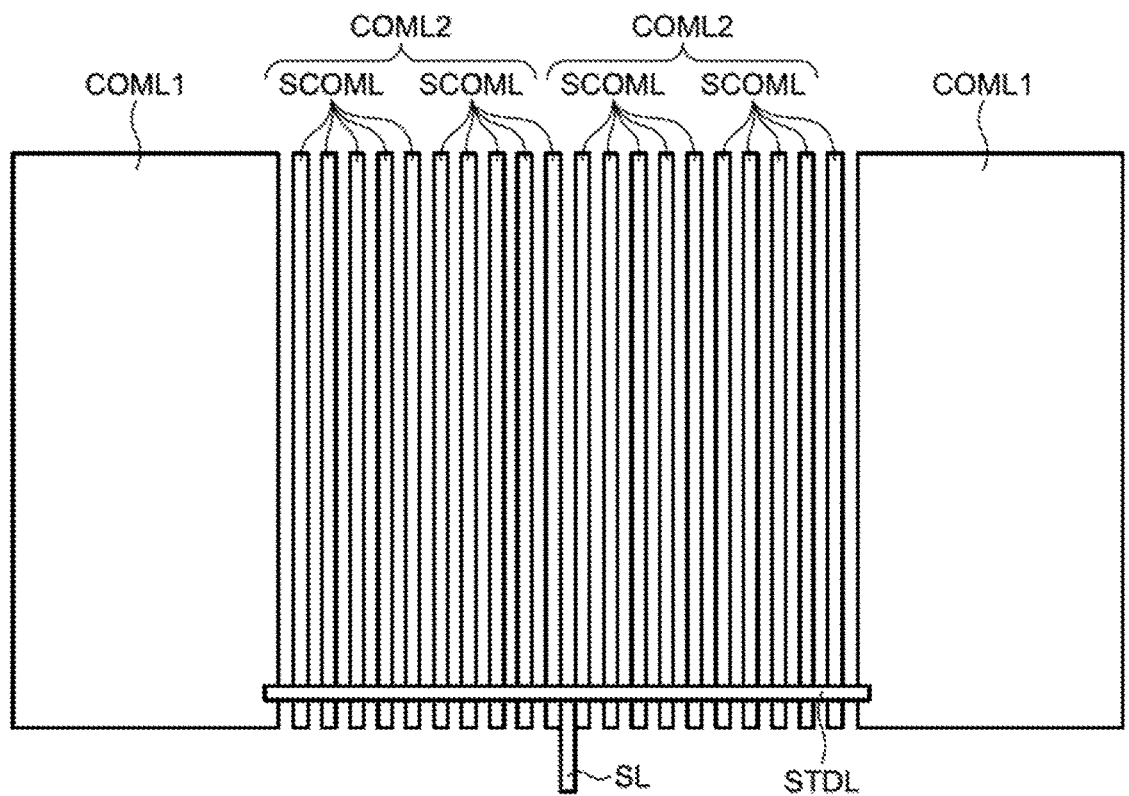
FIG. 29 is a plan view illustrating a positional relation between a drive electrode, a subdivided electrode, and a second touch detection electrode according to a fifth modification.

FIG. 29 is a plan view illustrating a positional relation between the drive electrodes COML1 and COML2, the subdivided electrode SCOML, and the second touch detection electrode STDL according to a fifth modification. Although a plurality of second touch detection electrodes STDL are provided in the above embodiment (refer to FIG. 14) and the fourth modification (refer to FIGS. 24 and 25), the number of the second touch detection electrodes STDL may be one as illustrated in FIG. 29, for example. If the number of the second touch detection electrodes STDL is one, the second touch detection unit 60 can detect a fingerprint when a finger moves along a direction in which the subdivided electrode SCOML is extended while performing a touch operation on the second touch detection electrode STDL, for example. That is, assuming that a part of the fingerprint detected by the second touch detection electrode STDL varies in accordance with movement of the finger, touch detection is performed multiple times in the second mode using one second touch detection electrode STDL while the finger is moving. Due to this, a detection result corresponding to a plurality of lines detected by a plurality of second touch detection electrodes STDL as illustrated in FIG. 9 can be obtained with one touch detection electrode. The second touch detection electrode STDL according to the fifth modification outputs the second touch detection signal Vdet2 via wiring SL, for example.

Sixth Modification

Figure 30:
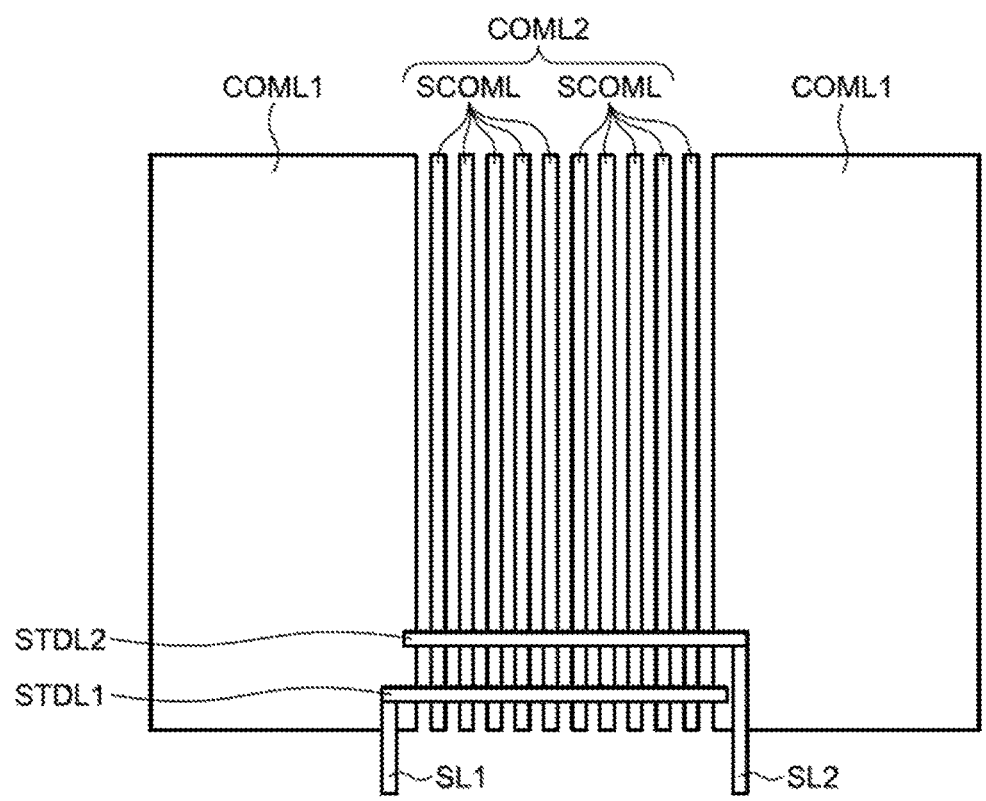
FIG. 30 is a plan view illustrating a positional relation between a drive electrode, a subdivided electrode, and a second touch detection electrode according to a sixth modification.

FIG. 30 is a plan view illustrating a positional relation between the drive electrodes COML1 and COML2, the subdivided electrode SCOML, and the second touch detection electrode STDL according to a sixth modification. In FIG. 29, the number of the second touch detection electrodes STDL is one. Alternatively, assuming that the finger moves, a plurality of second touch detection electrodes (for example, two second touch detection electrodes STDL1 and STDL2) may be provided. The second touch detection electrode STDL1 according to the sixth modification outputs the second touch detection signal Vdet2 via wiring SL1, for example. The second touch detection electrode STDL2 outputs the second touch detection signal Vdet2 via wiring SL2, for example.

When the two second touch detection electrodes STDL1 and STDL2 are provided as illustrated in FIG. 30, assuming that the part of the fingerprint detected by the second touch detection electrodes STDL1 and STDL2 varies in accordance with movement of the finger, touch detection is performed multiple times in the second mode using the two second touch detection electrodes STDL1 and STDL2 while the finger is moving. Because the finger moves, a detection result obtained by the second touch detection electrode STDL1 at a first timing is substantially the same as that obtained by the second touch detection electrode STDL2 at a second timing. The difference between the first timing and the second timing depends on the moving speed of the finger. That is, as the moving speed of the finger with respect to the two second touch detection electrodes STDL1 and STDL2 increases, the difference between the first timing and the second timing is reduced. Thus, on the precondition that the finger moves, a plurality of second touch detection electrodes STDL allow obtaining the moving speed of the finger in touch detection for fingerprint detection. Based on such a moving speed of the finger, parameters related to various data corrections can be set under more favorable condition, the parameters including a degree of overlapping between detection results related to acquirement of the fingerprint by synthesizing detection results and the like. Thus, according to the sixth modification, accuracy in synthesizing the detection results can be further improved.

The drive electrodes COML in FIG. 29 include two drive electrodes COML2 arranged in parallel with each other, and the drive electrodes COML in FIG. 30 include one drive electrode COML2. However, this is merely an example of variation of arrangement of the drive electrode COML2 including the subdivided electrode SCOML. The arrangement is not limited thereto, and can be appropriately modified. In the above embodiment and modifications, the number and the arrangement of the drive electrodes COML2 including the subdivided electrodes SCOML are freely determined. The extending length and the arrangement of the second touch detection electrode STDL are preferably determined in accordance with the number and the arrangement of the drive electrodes COML2 including the subdivided electrodes SCOML.

When a plurality of drive electrodes COML2 are arranged in parallel with each other as illustrated in FIG. 29, the touch detection using the first touch detection electrode TDL in the first mode may be performed prior to the second mode so as to detect the position of the finger in the detection region. In this case, the drive signal Vcom is output, in the second mode, to the subdivided electrodes SCOML included in the drive electrode COML2 corresponding to the position of the finger obtained based on the detection result in the first mode. Thus, the number of the subdivided electrodes SCOML can be further reduced, the subdivided electrodes SCOML to which the drive signal Vcom is output in touch detection using the second touch detection electrode STDL, such as fingerprint detection. Accordingly, power consumption can be reduced. Time required for touch detection with the same accuracy can also be reduced as compared with a case in which the drive signal Vcom is output to all of the subdivided electrodes SCOML. Considering a case in which touch detection is performed using the second touch detection electrode STDL within the same time, the time required for outputting the drive signal Vcom to all of the subdivided electrodes SCOML can be assigned to the time for outputting the drive signal Vcom multiple times to a smaller number of subdivided electrodes SCOML, so that touch detection can be performed multiple times. In this case, accuracy in detection can be easily enhanced.

Seventh Modification

Figure 31:
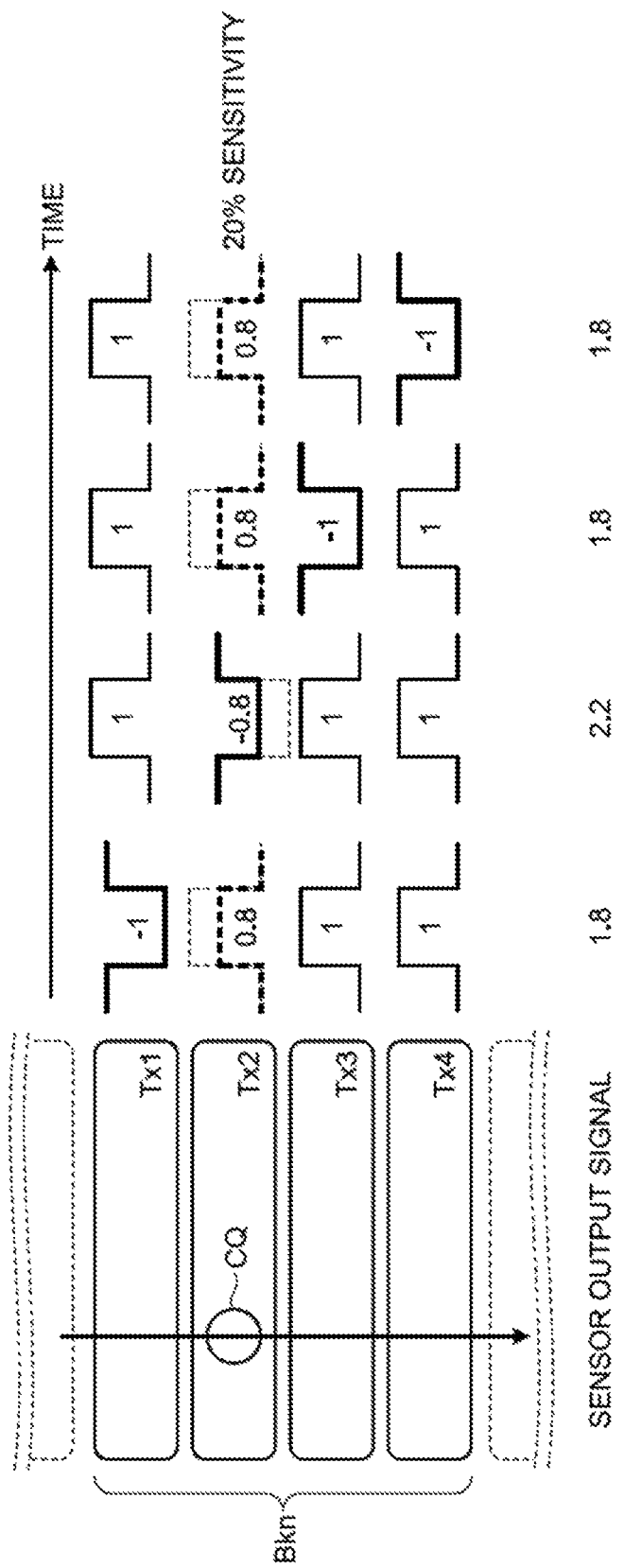
FIG. 31 is an explanatory diagram for explaining an example of an operation of code-division multiplexed driving.

FIG. 31 is an explanatory diagram for explaining an example of an operation of code-division multiplexed driving. In the above embodiment with reference to FIG. 9, exemplified is a case in which the second touch detection electrode STDL individually performs detection. Alternatively, a plurality of second touch detection electrodes STDL may be utilized at the same time to perform touch detection. Specifically, as illustrated in FIG. 31, for example, in the display device 1 with a touch detection function, the drive electrode driver 14 (or the subdivided electrode driver 90) selects a plurality of (four, in the example of FIG. 31) subdivided electrode blocks Tx1, Tx2, Tx3, and Tx4 of a selected subdivided electrode blocks Bkn at the same time and supplies, to the selected subdivided electrode blocks Bkn, the drive signal Vcom the phase of which is determined based on a predetermined code. In FIG. 31, waveforms illustrated on the right side of the subdivided electrode blocks Tx1, Tx2, Tx3, and Tx4 each exemplify the phase of the drive signal Vcom. For example, the predetermined code is defined with a square matrix represented by the following expression (1). An order of the square matrix of the expression (1) is four, which is the number of the subdivided electrode blocks Tx1, Tx2, Tx3, and Tx4 of the selected subdivided electrode blocks Bkn. A diagonal component "−1" in the square matrix of the expression (1) is different from a component "1" other than the diagonal component in the square matrix. The code "−1" is a code for supplying the drive signal Vcom the phase of which is determined to be different from that of the code "1". The drive electrode driver 14 and the like apply the drive signal Vcom based on the square matrix in the expression (1) so that the phase of the above-described AC rectangular wave Sg corresponding to the component "1" other than the diagonal component in the square matrix and the phase of the above-described AC rectangular wave Sg corresponding to the diagonal component "−1" in the square matrix are reversed.

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 1.8 \\ 2.2 \\ 1.8 \\ 1.8 \end{pmatrix} = \begin{pmatrix} 4.0 \\ 3.2 \\ 4.0 \\ 4.0 \end{pmatrix} \quad (1)$$

When a plurality of second touch detection electrodes STDL are utilized at the same time like the selected subdivided electrode blocks Bkn described above, the second touch detection unit 60 performs detection using a code division multiplex (CDM) system.

For example, when an external proximity object CQ such as a finger is present at the subdivided electrode block Tx2, which is the second position from an upstream side of scanning in the subdivided electrode blocks Tx1, Tx2, Tx3, and Tx4 of the selected subdivided electrode blocks Bkn, a difference voltage is caused by the external proximity object CQ by mutual induction (for example, the difference voltage is assumed to be 20%). In such an example, the second touch detection signal Vdet2 (sensor output signal) detected by the second touch detection unit 60 in a first detection (first time zone) is represented as $(-1)+(0.8)+(1)+(1)=1.8$. In the expression, "1.8" is signal intensity with reference to the signal intensity of the drive signal Vcom of the code "1". The second touch detection signal Vdet2 detected by the second touch detection unit 60 in a second detection (second time zone) subsequent to the first time zone is represented as $(1)+(-0.8)+(1)+(1)=2.2$. The second touch detection signal Vdet2 detected by the second touch detection unit 60 in a third detection (third time zone) subsequent to the second time zone is represented as $(1)+(0.8)+(-1)+(1)=1.8$. The second touch detection signal Vdet2 detected by the second touch detection unit 60 in a fourth detection (fourth time zone) subsequent to the third time zone is represented as $(1)+(0.8)+(1)+(-1)=1.8$.

The coordinate extracting unit 65 multiplies the second touch detection signals Vdet2 (sensor output signals) detected by the signal processing unit 64 using the square matrix of the expression (1). The coordinate extracting unit 65 detects that there is the external proximity object CQ such as a finger at the position of the subdivided electrode block Tx2 of the selected subdivided electrode blocks Bkn with detection sensitivity having higher accuracy (for example, four times) than that of time division multiplex (TDM) driving without increasing the voltage of the signal output as the drive signal Vcom.

According to the seventh modification, sensitivity of touch detection in the second mode is further enhanced. Thus, according to the seventh modification, touch detection accuracy can be improved. According to the seventh modification, the touch detection in the second mode can be completed in a short time. In particular, the arrangement pitch of the subdivided electrodes SCOML is finer than that of the drive electrodes COML, so that a degree of variation in voltage based on capacitance generated in accordance with the drive signal Vcom to one subdivided electrode SCOML, that is, a degree of variation in capacitance corresponding to presence/absence of a touch operation tends to be smaller. The arrangement pitch of the second touch detection electrodes STDL is finer than that of the first touch detection electrodes TDL, so that such a degree of variation tends to be smaller. In the second mode, the arrangement pitch of the electrodes for touch detection is finer than that in the first mode, so that difficulty in securing high sensitivity of touch detection is increased. Under such a condition, by using the CDM system in the second mode, sufficient sensitivity can be easily secured.

In the description with reference to FIG. 31 and the expression (1), the number of the subdivided electrode blocks (Tx1, Tx2, Tx3, and Tx4) included in the selected subdivided electrode blocks Bkn is four. However, this is merely an example to clarify the description, and the number is not limited thereto. The number of the subdivided electrode blocks included in the selected subdivided electrode blocks Bkn can be appropriately modified (for example, 128).

The characteristics of configurations described in the embodiment and modifications can be applied to each other only in a range in which they do not contradict each other. For example, the arrangement of the second touch detection unit 60 in the embodiment may be the same as that in the fourth modification, or the arrangement of the second touch detection unit 60 in the fourth modification may be the same as that in the embodiment. The extending direction of the drive electrodes COML can be any direction in the configurations in the fifth and the sixth modifications, so that the configuration of the fifth and the sixth modification can be applied to the embodiment and the fourth modification. The position of the second touch detection electrode in the fourth modification may be that in the first to the third modifications. The seventh modification can be combined with any of the embodiment and the other modifications.

The preferred embodiment of the present invention and the modifications thereof (embodiment and the like) have been described above. However, the present invention is not limited thereto. Content disclosed in the embodiment and the like is merely an example, and various modifications can be made without departing from the gist of the invention. The present invention naturally encompasses an appropriate modification maintaining the gist of the invention.

For example, in the embodiment and the like, described is a case in which the drive electrode COML also functions as the common electrode of the display panel 20. However, the embodiment is not limited thereto. The display device with a touch detection function may be configured such that the common electrode is arranged on the display panel and such that the touch panel is mounted on the display panel.

In the above embodiment and the like, the first detection unit (first touch detection unit 40) and the second detection unit (second touch detection unit 60) are separately provided. Alternatively, one circuit may have functions of such two circuits.

In the above embodiment and the like, the first touch detection electrode TDL and the second touch detection electrode STDL are separately arranged. Alternatively, the arrangement pitch of the first touch detection electrodes TDL may be the same as that of the second touch detection electrodes STDL, and the first touch detection electrodes TDL and the second touch detection electrodes STDL may be the same electrodes. Also in this case, with the configuration including the drive electrode COML2 including the subdivided drive electrode SCOML, resolution of detection in the first mode is different from that of the second mode, so that an operation corresponding to a purpose can be performed such as a distinguishing operation between identifying the position of the finger and detecting a fingerprint.

Numerical values such as the number of the drive electrodes COML, the number of the subdivided electrodes included in one drive electrode COML2, the number of the first touch detection electrodes TDL, and the number of the second touch detection electrodes STLD exemplified in the embodiment and illustrated in the drawings are merely an example, and can be appropriately modified.

What is claimed is:
1. A touch detection device comprising:
  drive electrodes, a drive signal being input to each of the drive electrodes;
  touch detection electrodes each arranged at a portion not in contact with the drive electrodes; and
  pixels displaying an image, wherein the drive electrodes and the touch detection electrodes are configured to perform a touch detection in a first sensing period and in a second sensing period,
a resolution of the touch detection in the second sensing period is higher than a resolution of the touch detection in the first sensing period,
video signals are input to the pixels within a display output period,
a first frame period includes the display output period and the first sensing period,
a second frame period includes the display output period and the second sensing period, the second frame period immediately following the first frame period,
the first frame period and the second frame period are alternately provided on a frame-period-by-frame-period basis,
the drive electrodes include a drive electrode including subdivided electrodes, an arrangement pitch of which is finer than an arrangement pitch of the drive electrodes,
the drive electrode including subdivided electrodes is driven on a drive electrode basis in the first sensing period and driven on a subdivided electrode basis in the second sensing period, and
the touch detection electrodes include a second touch detection electrode that performs touch detection in the second sensing period and does not perform touch detection in the first sensing period.

2. The touch detection device according to claim 1, wherein the touch detection is done in a first area in the first sensing period and in a second area in the second sensing period, and
the first area is larger than the second area.

3. The touch detection device according to claim 2, wherein the second area is located in the first area.

4. The touch detection device according to claim 2, wherein the subdivided electrodes are located in the second area, and the other drive electrodes are located in the first area.

5. The touch detection device according to claim 1, wherein the drive electrodes further include first drive electrodes other than the drive electrode including subdivided electrodes,
each of the first drive electrodes does not have a plurality of subdivided electrodes, and
the drive signal is sequentially input to each of the subdivided electrodes in the second sensing period.

6. The touch detection device according to claim 5, wherein the drive signal is input to all of the subdivided electrodes at a same time in the first sensing period.

7. The touch detection device according to claim 1, wherein the touch detection is done in a first area in the first sensing period and in a second area in the second sensing period,
the drive electrodes further include first drive electrodes other than the drive electrode including subdivided electrodes,
the drive electrode including subdivided electrodes is located in the second area, and
each of the first drive electrodes does not have a plurality of subdivided electrodes.

8. The touch detection device according to claim 1, wherein the first frame period includes a plurality of first sensing periods including the first sensing period.

9. The touch detection device according to claim 1, wherein the second frame period includes a plurality of second sensing periods including the second sensing period.

10. The touch detection device according to claim 1, wherein a length of the first sensing period is different from a length of the second sensing period.

11. The touch detection device according to claim 10, wherein the second sensing period is longer than the first sensing period.

12. The touch detection device according to claim 1, wherein
the touch detection electrodes include a plurality of the second touch detection electrode, an arrangement pitch of which is finer than an arrangement pitch of the other touch detection electrodes.

* * * * *